（12） United States Patent
Tsuboi et al.

(10) Patent No.: US 10,455,177 B2
(45) Date of Patent: Oct. 22, 2019

(54) METHOD FOR DRIVING IMAGING APPARATUS

(71) Applicant: CANON KABUSHIKI KAISHA, Tokyo (JP)

(72) Inventors: Toshiki Tsuboi, Tokyo (JP); Hisashi Takado, Kawasaki (JP); Takeshi Ichikawa, Hachioji (JP); Kazuyuki Shigeta, Yokohama (JP); Fumihiro Inui, Yokohama (JP); Masahiro Kobayashi, Tokyo (JP); Yusuke Onuki, Fujisawa (JP); Kazunari Kawabata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 330 days.

(21) Appl. No.: 15/363,769

(22) Filed: Nov. 29, 2016

(65) Prior Publication Data

US 2017/0163921 A1 Jun. 8, 2017

(30) Foreign Application Priority Data

Dec. 4, 2015 (JP) ................................ 2015-237865

(51) Int. Cl.
*H04N 5/374* (2011.01)
*H04N 5/341* (2011.01)
*H04N 5/376* (2011.01)
*H04N 5/355* (2011.01)
*H04N 5/3745* (2011.01)

(52) U.S. Cl.
CPC ........... *H04N 5/3742* (2013.01); *H04N 5/341* (2013.01); *H04N 5/35572* (2013.01); *H04N 5/35581* (2013.01); *H04N 5/376* (2013.01); *H04N 5/37452* (2013.01)

(58) Field of Classification Search
CPC .... H04N 5/374–5/37457; H04N 5/335–5/378; H01L 27/146–27/14893
USPC ....... 348/294–324; 250/208.1; 257/225–234, 257/257, 258, 291–294, 431–448
See application file for complete search history.

(56) References Cited

U.S. PATENT DOCUMENTS

| | | | |
|---|---|---|---|
| 2006/0146161 A1* | 7/2006 | Farrier | H01L 27/14603 348/308 |
| 2009/0213253 A1* | 8/2009 | Fukuoka | H04N 5/359 348/294 |
| 2010/0133590 A1* | 6/2010 | Mheen | H01L 27/14603 257/225 |
| 2013/0135486 A1 | 5/2013 | Wan | |

(Continued)

FOREIGN PATENT DOCUMENTS

| | | |
|---|---|---|
| CN | 103905748 A | 7/2014 |
| CN | 104322053 A | 1/2015 |
| CN | 104639848 A | 5/2015 |

(Continued)

*Primary Examiner* — Xi Wang
(74) *Attorney, Agent, or Firm* — Canon U.S.A., Inc. IP Division

(57) ABSTRACT

In a state where an electric charge is held in a first charge holding unit, starting accumulation of an electric charge in a photoelectric conversion unit simultaneously in a plurality of pixel rows, and performing a first transfer operation for transferring an electric charge from the photoelectric conversion unit to the first charge holding unit simultaneously in the plurality of pixel rows.

10 Claims, 16 Drawing Sheets

(56) References Cited

U.S. PATENT DOCUMENTS

2013/0206964 A1  8/2013  Yamashita
2015/0264243 A1  9/2015  Ichikawa

FOREIGN PATENT DOCUMENTS

KR   10-2012-0112778 A   10/2012
WO      2011/096340 A1    8/2011

* cited by examiner

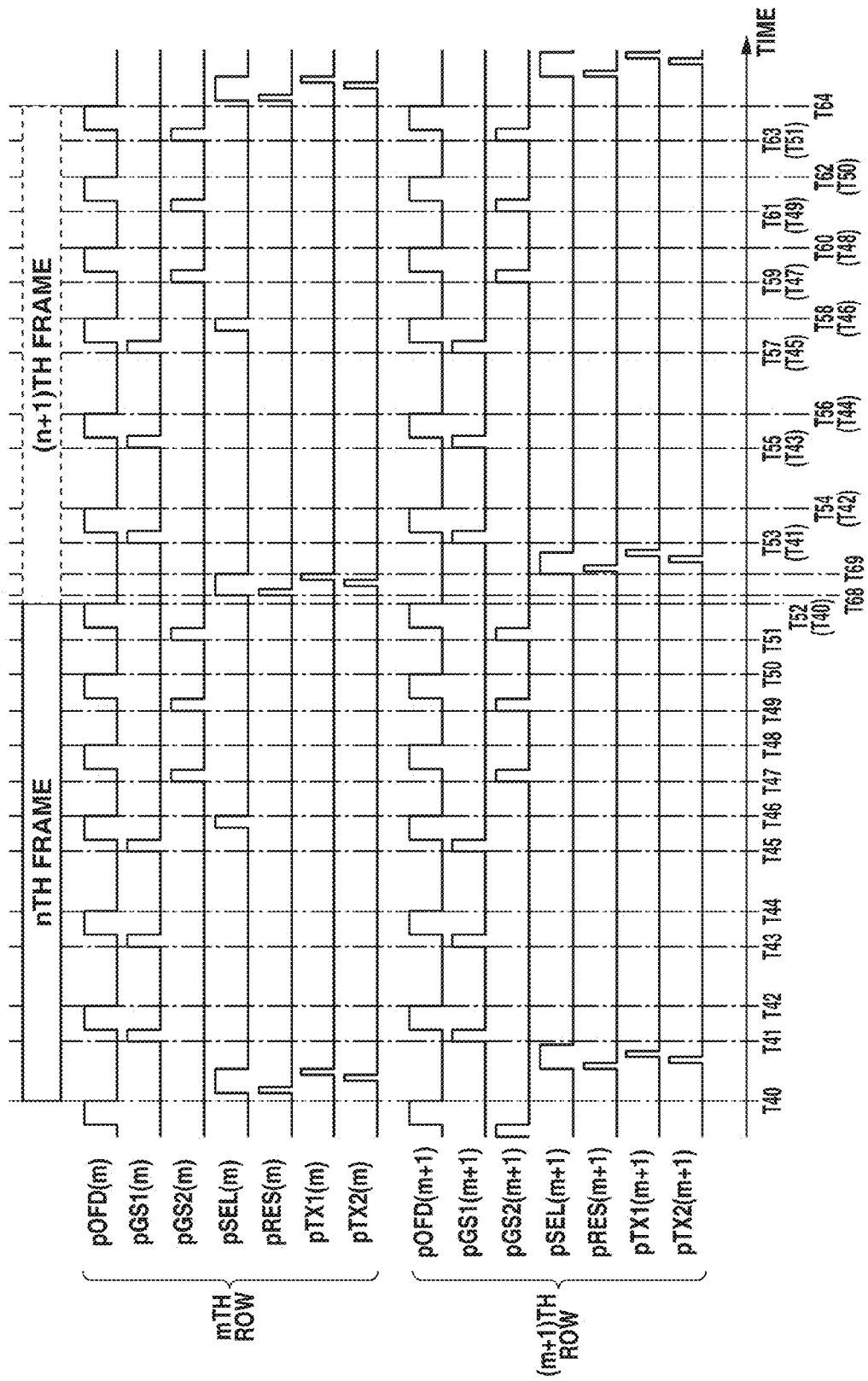

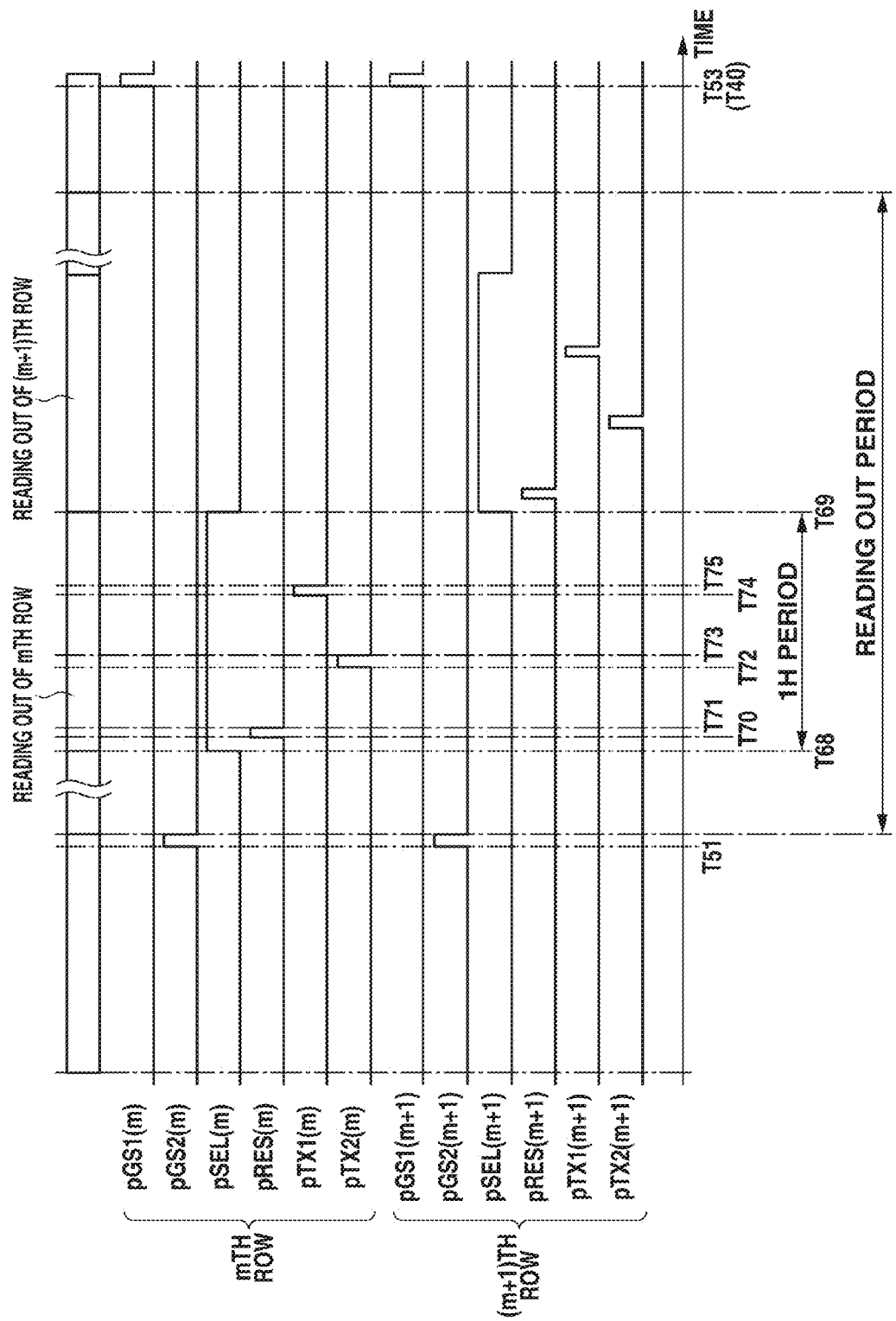

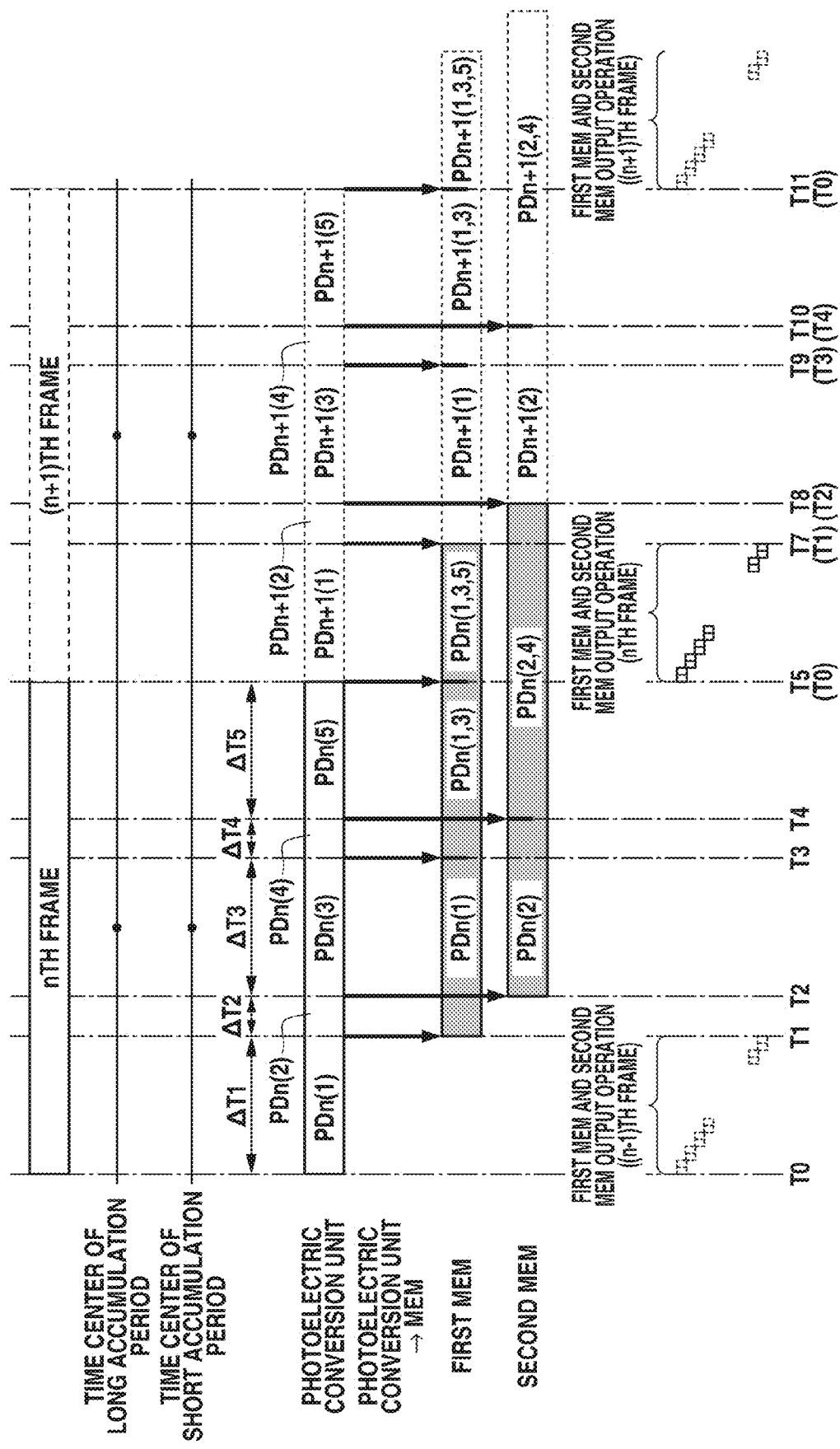

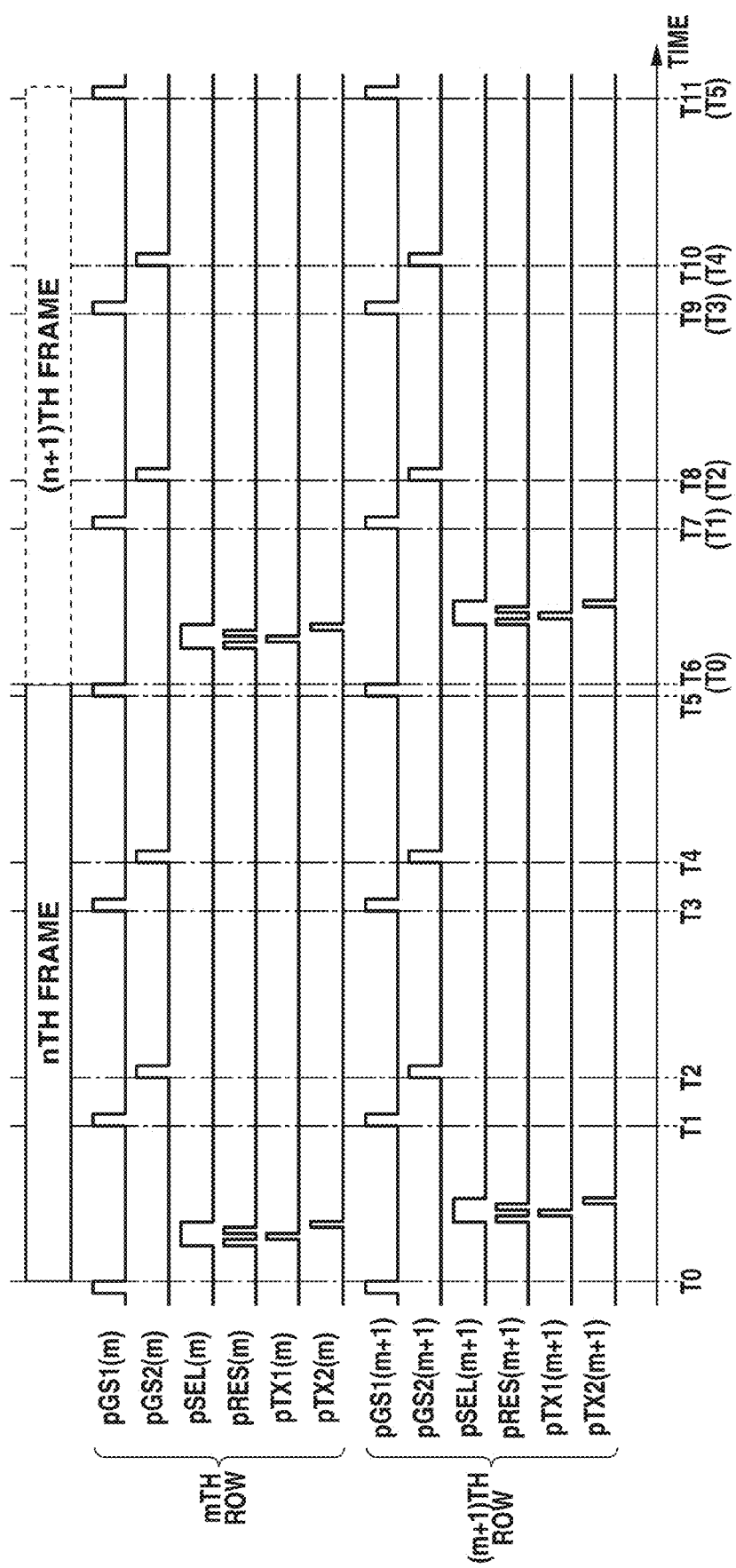

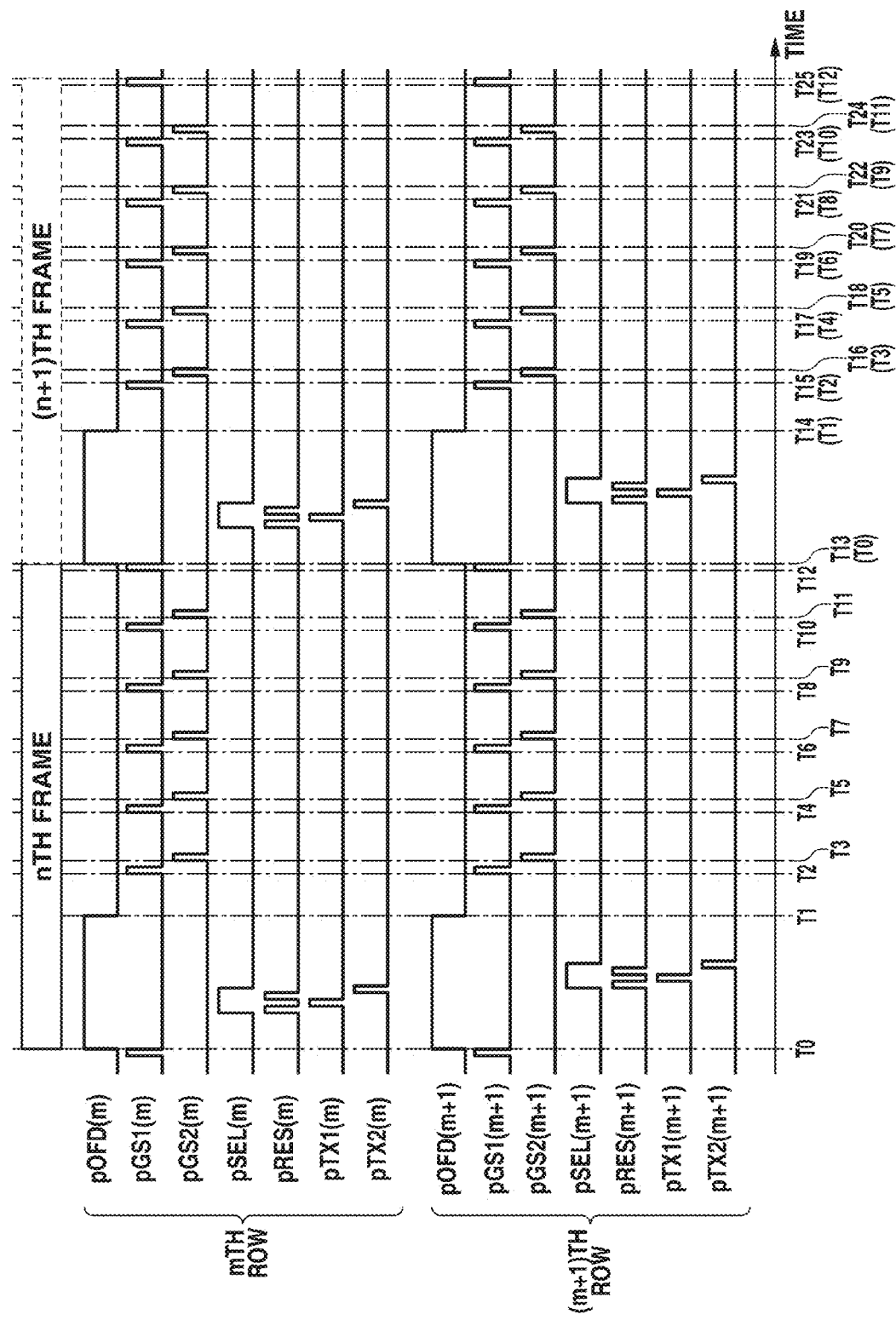

METHOD FOR DRIVING IMAGING APPARATUS

BACKGROUND OF THE INVENTION

Field of the Invention

The present invention relates to a method for driving an imaging apparatus.

Description of the Related Art

An imaging apparatus discussed in the publication WO2011/096340 has a configuration in which a plurality of charge holding units are disposed in parallel for a single photoelectric conversion unit.

SUMMARY OF THE INVENTION

According to an aspect of the present invention, a driving method for driving an imaging apparatus comprising a plurality of pixels disposed in a matrix, and each pixel including a photoelectric conversion unit, at least two charge holding units each configured to hold an electric charge generated by the photoelectric conversion unit, the at least two charge holding units including a first charge holding unit and a second charge holding unit, a first transfer unit configured to transfer an electric charge generated by the photoelectric conversion unit from the photoelectric conversion unit to the first charge holding unit, a second transfer unit configured to transfer an electric charge generated by the photoelectric conversion unit from the photoelectric conversion unit to the second charge holding unit, and an amplification transistor configured to output a signal based on at least one of an electric charge held in the first charge holding unit and an electric charge held in the second charge holding unit, the driving method including, in a state where an electric charge is held in the first charge holding unit, starting accumulation of an electric charge in the photoelectric conversion unit simultaneously in a plurality of pixel rows, and performing a first transfer operation for transferring an electric charge from the photoelectric conversion unit to the first charge holding unit simultaneously in the plurality of pixel rows.

Further features of the present invention will become apparent from the following description of exemplary embodiments with reference to the attached drawings.

BRIEF DESCRIPTION OF THE DRAWINGS

FIGS. 11A and 11B are diagrams of driving pulses.
FIG. 12 is a conceptual diagram of driving.
FIG. 13 is a diagram of driving pulses.
FIG. 15 is a diagram of driving pulses.

DESCRIPTION OF THE EMBODIMENTS

Figure 1:
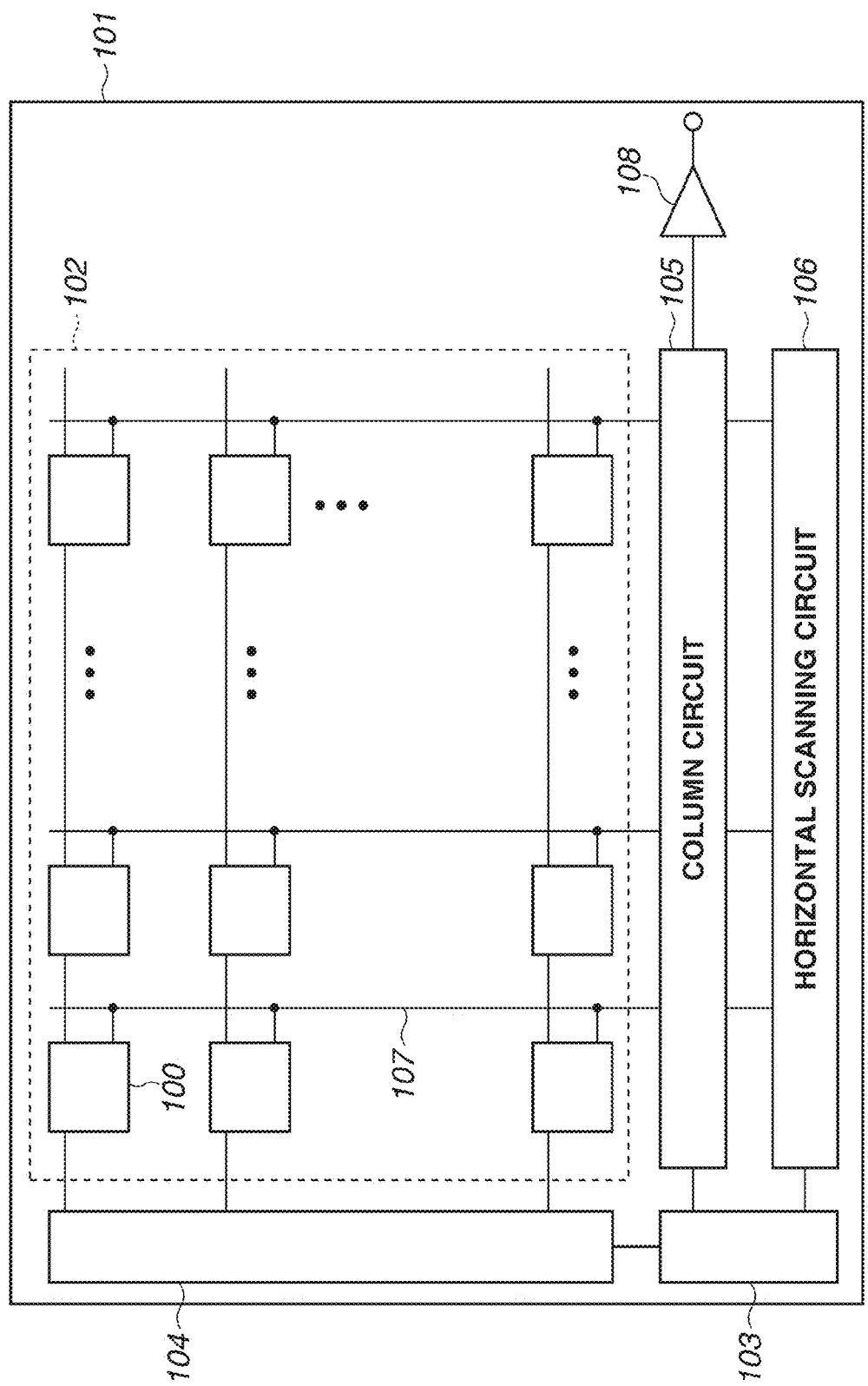
FIG. 1 is a block diagram of an imaging apparatus.
Figure 2:
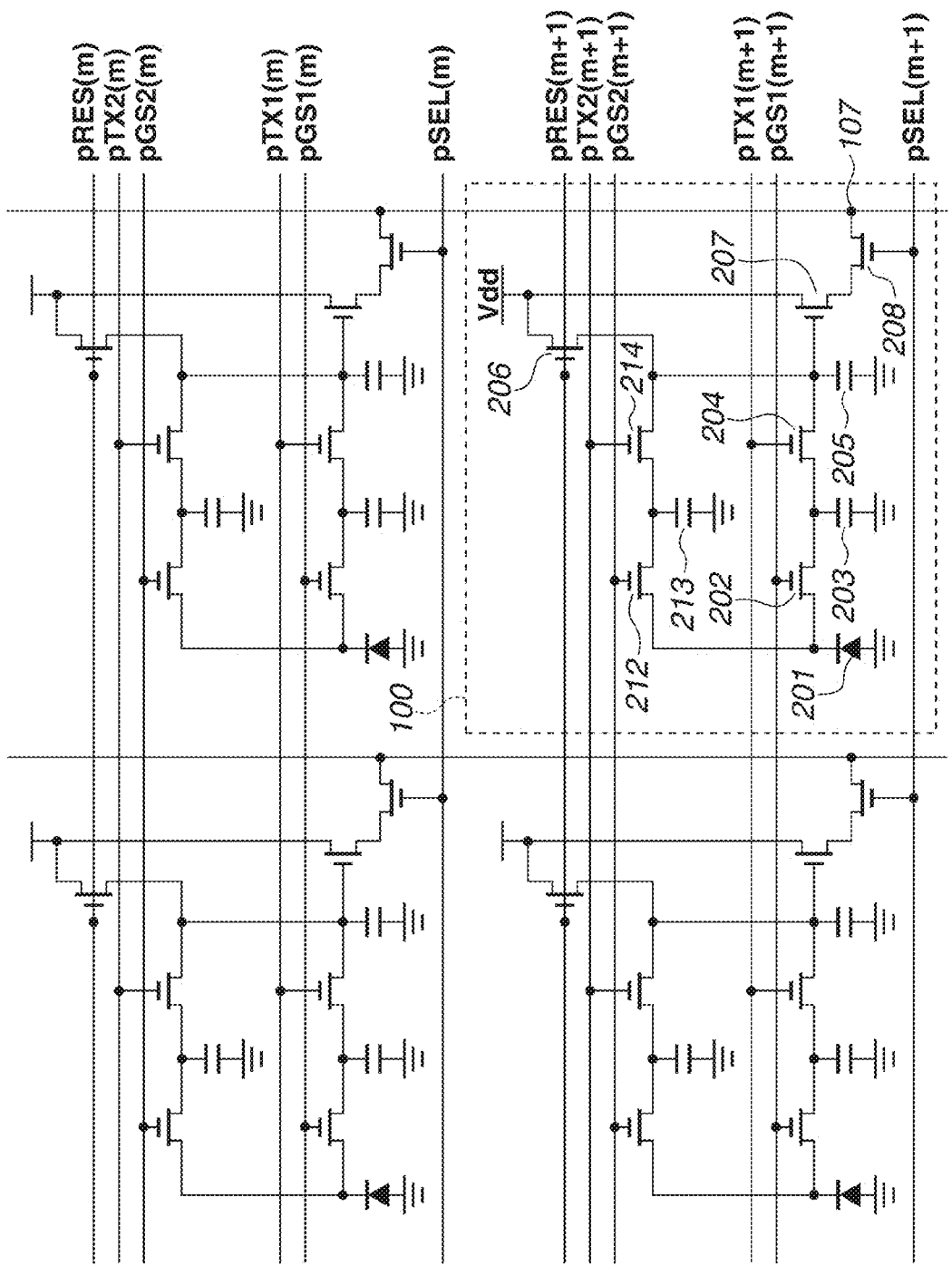
FIG. 2 is a circuit diagram of pixels.
Figure 3:
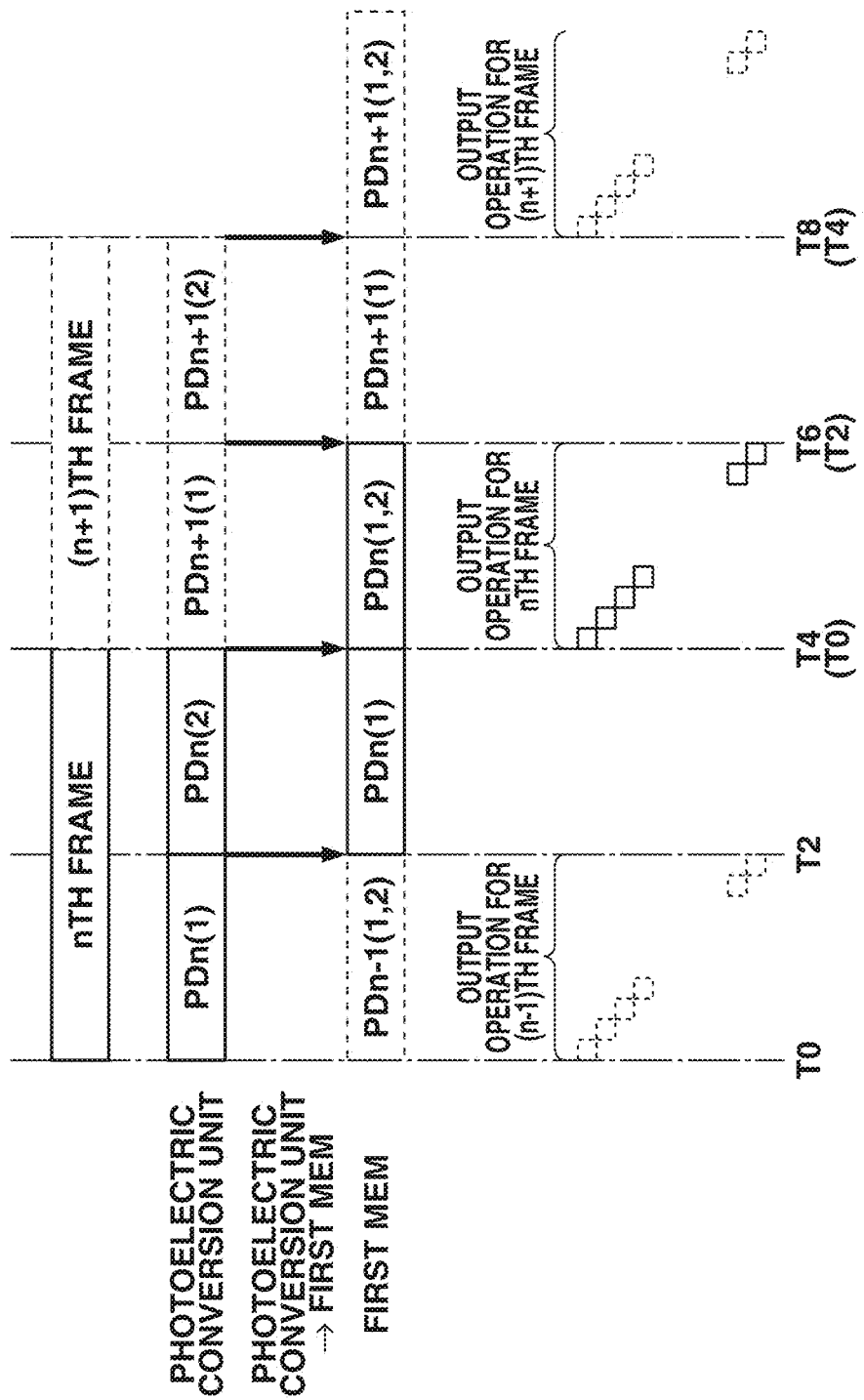
FIG. 3 is a conceptual diagram of driving.

With reference to FIGS. 1 to 3, an imaging apparatus according to the present exemplary embodiment is described. In the drawings, portions designated by the same numerals refer to the same elements or the same regions.

FIG. 1 illustrates a block diagram of an imaging apparatus 101. The imaging apparatus 101 includes a pixel portion 102, a pulse generation unit 103, a vertical scanning circuit 104, a column circuit 105, a horizontal scanning circuit 106, signal lines 107, and an output circuit 108.

The pixel portion 102 includes, on an imaging surface, a plurality of pixels 100 each of which converts light into an electric signal and outputs the converted electric signal. The plurality of pixels 100 are arranged in a two-dimensional manner. The vertical scanning circuit 104 receives a control pulse from the pulse generation unit 103 and supplies a driving pulse to each pixel 100. As the vertical scanning circuit 104, a logic circuit, such as a shift register or an address decoder, is used.

The signal lines 107 are disposed for respective pixel columns of the pixel portion 102, and signals from the pixels 100 are output to the signal lines 107.

To the column circuit 105, signals output in parallel via the signal lines 107 are input. The input signals are subjected to predetermined processing. The predetermined processing is at least one of noise removal, signal amplification, and analog-to-digital (AD) conversion.

The horizontal scanning circuit 106 supplies to the column circuit 105 a driving pulse for sequentially outputting signals processed by the column circuit 105. The output circuit 108 includes a buffer amplifier and a differential amplifier and outputs a pixel signal from the column circuit 105 to a signal processing unit outside the imaging apparatus 101.

FIG. 2 illustrates a circuit diagram of the pixels 100. FIG. 2 illustrates four pixels 100 in two rows and two columns among the plurality of pixels 100 arranged in a two-dimensional manner.

In the present exemplary embodiment, an electron is treated as a signal charge (hereinafter also referred to as an "electric charge"). In the following description, each transistor is assumed to be an N-type transistor. For an electron hole state, the opposite conductivity type of a semiconductor region may be provided for each of a photoelectric conversion unit 201, a first charge holding unit 203, and a floating diffusion (hereinafter, "FD") 205.

Each pixel 100 includes two charge holding units, each of which holds an electric charge generated by a single photoelectric conversion unit. In the following description, to distinguish the two charge holding units from each other, one of the charge holding units is defined as a first charge holding unit, and the other charge holding unit is defined as a second charge holding unit.

When light is incident on a photoelectric conversion unit 201, the photoelectric conversion unit 201 generates a charge pair and holds an electron. In the present exemplary embodiment, as an example of the photoelectric conversion unit 201, a photodiode is illustrated.

The first charge holding unit 203 and a second charge holding unit 213 hold electric charges transferred from the photoelectric conversion unit 201.

A first transfer unit 202 transfers an electric charge generated by the photoelectric conversion unit 201 to the first charge holding unit 203. To the first transfer unit 202, a driving pulse pGS1 is supplied, and the first transfer unit 202 is switched between an on state (conduction) and an off state (non-conduction) by the driving pulse pGS1. Specifically, the driving pulse pGS1 changes to a high level (hereinafter, an "H-level"), whereby the first transfer unit 202 is switched to an on state. Further, the driving pulse pGS1 changes to a low level (hereinafter, an "L-level") or below, whereby the first transfer unit 202 is switched to an off state. Hereinafter, a voltage at or below the L-level is referred to as an "off voltage". The same applies to the following driving pulses.

A second transfer unit 212 transfers an electric charge generated by the photoelectric conversion unit 201 to the second charge holding unit 213. To the second transfer unit 212, a driving pulse pGS2 is supplied, and the second transfer unit 212 is switched between an on state and an off state by the driving pulse pGS2.

A third transfer unit 204 transfers an electric charge held in the first charge holding unit 203 to FD 205. To the third transfer unit 204, a driving pulse pTX1 is supplied, and the third transfer unit 204 is switched between an on state and an off state by the driving pulse pTX1.

A fourth transfer unit 214 transfers an electric charge held in the second charge holding unit 213 to the FD 205. To the fourth transfer unit 214, a driving pulse pTX2 is supplied, and the fourth transfer unit 214 is switched between an on state and an off state by the driving pulse pTX2. Each transfer unit can be composed of a transistor.

The FD 205 is a semiconductor region to which electric charges of the respective charge holding units are transferred by the third transfer unit 204 and the fourth transfer unit 214. The FD 205 holds an electric charge for a predetermined period. The FD 205 is connected to a gate of an amplification transistor 207 and forms a part of an input node of the amplification transistor 207.

The amplification transistor 207 forms a source follower, amplifies a signal based on an electric charge transferred to the FD 205, and outputs the signal to a signal line 107 via a selection transistor 208. A drain of the amplification transistor 207 is connected to power supply wiring to which power is supplied from a power supply Vdd. The source of the amplification transistor 207 is connected to a drain of the selection transistor 208, and the source of the selection transistor 208 is connected to the signal line 107.

A reset transistor 206 resets the voltage of an input node including the FD 205. To a gate of the reset transistor 206, a driving pulse pRES1 is supplied. The driving pulse pRES1 changes to the H-level, whereby the reset transistor 206 is switched to an on state. The driving pulse pRES1 changes to the L-level, whereby the reset transistor 206 is switched to an off state.

The selection transistor 208 controls electrical conduction between the amplification transistor 207 and the signal line 107 and causes a signal of each one of a plurality of pixels 100 provided for the single signal line 107, or signals of every two or more of the plurality of pixels 100, to be output to the signal line 107. To a gate of the selection transistor 208, a driving pulse pSEL is supplied. The driving pulse pSEL changes to the H-level, whereby the selection transistor 208 is switched to an on state. The driving pulse pSEL changes to the L-level, whereby the selection transistor 208 is switched to an off state. Alternatively to the configuration of the present exemplary embodiment, the selection transistor 208 may not be provided, and the potential of the drain of the amplification transistor 207 or the gate of the amplification transistor 207 may be switched, whereby the signal line 107 is switched between a selected state and a non-selected state.

Next, with reference to FIG. 3, a description is given of temporal changes in the transfer and the holding of electric charges generated by a photoelectric conversion unit 201 of the imaging apparatus 101 according to the present exemplary embodiment, and the state where signals are read out.

In FIG. 3, a charge holding unit is referred to as "MEM". The same applies to the following figures.

A description is given below of a global electronic shutter operation for, in a plurality of pixel rows, i.e., the plurality of pixels 100 disposed in a two-dimensional manner, matching the start of the generation of an electric charge by a photoelectric conversion unit 201 and the transfer of an electric charge from the photoelectric conversion unit 201 to a charge holding unit. This is, however, also applicable to a rolling shutter operation for, in each pixel row, sequentially starting the accumulation of an electric charge in a photoelectric conversion unit and transferring an electric charge from the photoelectric conversion unit to a charge holding unit. Further, this is also applicable to a mechanical shutter operation. In such a case, a non-exposure period is included between frames illustrated in FIG. 3. The same applies to examples other than those in the present exemplary embodiment.

Further, in the following figures and description, a "frame" refers to a period corresponding to each frame for capturing images of a plurality of frames to obtain a moving image. That is, for example, in a case where images of 60 frames are captured per second, each frame corresponds to 1/60 seconds. Also in a case where a still image is captured, similarly, each frame corresponds to a time obtained by dividing a predetermined period by the number of captured images. For example, in a case where images of 10 frames are captured per second, each frame corresponds to 1/10 seconds. Further, examples of the start time and the end time of a period corresponding to each frame are as follows.

A first example is a case where the start time is the time when reset of the photoelectric conversion unit 201 is canceled, and accumulation of an electric charge in the photoelectric conversion unit 201 is enabled, and the end time is the time when the reset of the photoelectric conversion unit 201 for the next frame is canceled, and the accumulation of an electric charge in the photoelectric conversion unit 201 is enabled. The first example corresponds to, for example, operations described below in FIGS. 8 and 10.

A second example is a case where the start time is the time when the transfer of an electric charge of the photoelectric conversion unit 201 for the previous frame is completed, and the end time is the time when the transfer of an electric charge of the photoelectric conversion unit 201 for generating an image of the current frame ends. The second example corresponds to, for example, operations described below in FIGS. 3, 5, 12, and 14. The start times and the end times in these examples may be combined.

Although these examples are specific examples, further in each exemplary embodiment, an accumulation period of the photoelectric conversion unit 201 may be flexibly changed using an overflow drain (hereinafter, an "OFD"). In such a case, the start time and the end time may be set to any times between the time of when the transfer of an electric charge of the photoelectric conversion unit 201 for the previous frame is completed and the time of when the reset of the photoelectric conversion unit 201 is canceled.

FIG. 3 is a diagram conceptually illustrating an electric charge generated by the photoelectric conversion unit 201, an electric charge held in the first charge holding unit 203, and the operation of outputting these electric charges. The timing when an electric charge is transferred from the photoelectric conversion unit 201 to the first charge holding unit 203 is indicated by an arrow.

In FIG. 3, an operation for generating an image of an nth frame is indicated by a solid line, and an operation for generating an image of a frame other than the nth frame is indicated by a dotted line. In the present exemplary embodiment, operations corresponding to the nth frame are mainly described.

In FIG. 3, a period T0-T4 is a period corresponding to the image of the nth frame, and a period T4-T8 is a period corresponding to an image of an (n+1)th frame.

At a time T0, the period corresponding to the nth frame starts. At the time T0, the accumulation of electric charges generated by the photoelectric conversion unit 201 is started. At this time, in the first charge holding unit 203, electric charges (PDn-1(1,2)) for generating an image of an (n−1)th frame are held. Then, in a period T0-T2, signals of pixels in respective pixel rows corresponding to the electric charges held in the first charge holding unit 203 are output sequentially row by row.

At a time T2, electric charges PDn(1) generated by the photoelectric conversion unit 201 in the period T0-T2 are transferred to the first charge holding unit 203 collectively in all the pixels. Then, the accumulation of electric charges generated by the photoelectric conversion unit 201, which has ended the above transfer of the electric charges, is started.

At a time T4, electric charges PDn(2) generated by the photoelectric conversion unit 201 in a period T2-T4 are transferred to the first charge holding unit 203 collectively in all the pixels. This transfer is performed in the state where the electric charges PDn(1) transferred at the time T2 are held in the first charge holding unit 203. Thus, the electric charges PDn(1) transferred at the time T2 and the electric charges PDn(2) transferred at the time T4 are added together, and electric charges PDn(1,2) obtained by the addition are held in the first charge holding unit 203. Then, further, at the time T4, the transfer of electric charges for generating the image of the nth frame is completed. Thus, at the time T4, the period corresponding to the (n+1)th frame starts, and the accumulation of electric charges generated by the photoelectric conversion unit 201 is started.

In a period T4-T6, signals corresponding to the electric charges PDn(1,2) held in the first charge holding unit 203 are output sequentially row by row.

That is, the present exemplary embodiment is characterized by including a first transfer operation for transferring an electric charge generated by one photoelectric conversion unit, from the photoelectric conversion unit to one of charge holding units in the state where an electric charge is held in the one of the charge holding units. Unlike the photoelectric conversion unit, each charge holding unit can be designed to be specialized in holding an electric charge. Thus, it is easier to increase the amount of saturation charge in the charge holding unit than in the photoelectric conversion unit. Thus, an operation as described above can be performed without causing blooming.

The present exemplary embodiment is described below, taking specific exemplary embodiments as examples.

Figure 4:
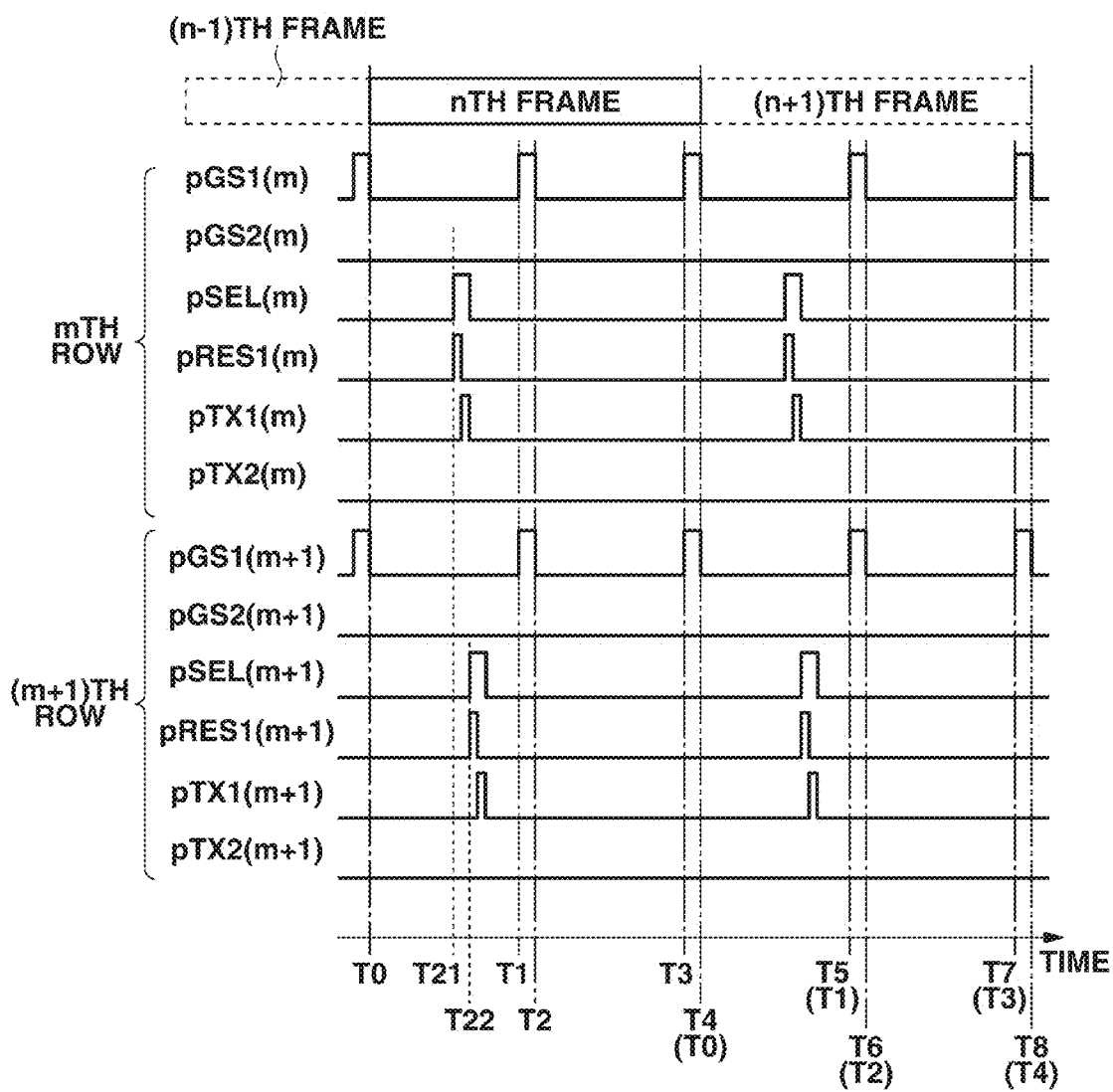
FIG. 4 is a diagram of driving pulses.

FIG. 4 is a diagram of driving pulses according to a first exemplary embodiment. In the description of the diagram of driving pulses illustrated in FIG. 4, "(m)" is added to the end of the name of a driving signal to be supplied to pixels 100 in an mth row, and "(m+1)" is added to the end of the name of a driving signal to be supplied to pixels 100 in an (m+1)th row. In the description, when rows are not particularly distinguished from each other, nothing is added to the end of the name of a driving pulse. Further, times designated by the same numerals as those indicating the times illustrated in FIG. 3 indicate the same times.

In FIG. 4, at a time T0, a driving pulse pGS1 changes to the L-level, whereby the first transfer unit 202 is switched to an off state. Then, the accumulation of electric charges generated by the photoelectric conversion unit 201 is started.

At a time T21, a driving pulse pSEL(m) changes to the H-level, whereby the selection transistor 208 is switched to an on state. Next, a driving pulse pRES1(m) changes to the H-level, whereby the reset transistor 206 is switched to an on state. At this time, electric charges of the FD 205 are discharged to the power supply Vdd. Then, the driving pulse pRES1(m) changes to the L-level, whereby the reset transistor 206 is switched to an off state.

Then, a driving pulse pTX1(m) changes to the H-level, and the third transfer unit 204 is switched to an on state, whereby the electric charges (PDn-1(1,2)) for generating an image of an (n−1)th frame held in the first charge holding unit 203 are transferred to the FD 205. After the driving pulse pTX1(m) changes to the L-level, the driving pulse pSEL(m) changes to the L-level, whereby the selection transistor 208 is switched to an off state. Then, from a time T22, an output operation for an (m+1)th row is performed. Through such an operation for a row of which signals need to be read out, signals for generating an image of an nth frame can be output.

Next, at the time T1, the driving pulse pGS1 changes to the H-level, whereby the first transfer unit 202 is switched to an on state.

At a time T2, the driving pulse pGS1 changes to the L-level, whereby the first transfer unit 202 is switched to an off state. Electric charges (PDn(1)) generated by the photoelectric conversion unit 201 in a period T1-T2 are transferred to the first charge holding unit 203 in all the pixels. When the first transfer unit 202 is switched to an off state at the time T2, electric charges generated by the photoelectric conversion unit 201 are accumulated in the photoelectric conversion unit 201.

At a time T3, the driving pulse pGS1 changes to the H-level, whereby the first transfer unit 202 is switched to an on state. At a time T4, the driving pulse pGS1 changes to the L-level, whereby the first transfer unit 202 is switched to an off state. Electric charges (PDn(2)) accumulated in the photoelectric conversion unit 201 in a period T3-T4 are transferred to the first charge holding unit 203 in all the pixels. The operation performed in the period T3-T4 corresponds to the first transfer operation described in FIG. 3.

In a period after the time T4, electric charges PDn(1,2), which are the sum of the electric charges PDn(1) and PDn(2), are held in the first charge holding unit 203.

Through the above operation, a period corresponding to the nth frame ends.

Next, at the time T4, a period corresponding to an (n+1)th frame starts. In a period T4-T5, the operation of outputting signals for generating the image of the nth frame is performed. Then, operations are performed such that the time T4 corresponds to the time T0, a time T5 corresponds to the time T1, a time T6 corresponds to the time T2, a time T7 corresponds to the time T3, and a time T8 corresponds to the time T4.

According to the present exemplary embodiment, it is possible to shorten the period in which a photoelectric conversion unit alone accumulates an electric charge, and it is possible to reduce blooming due to the leakage of an electric charge from the photoelectric conversion unit.

In a case where, although the photoelectric conversion unit 201 transfers electric charges to the first charge holding unit 203 multiple times, the photoelectric conversion unit 201 still becomes saturated, the second transfer unit 212 is switched to an on state, whereby an electric charge can be held in the second charge holding unit 213. Alternatively, the potential for an electric charge between the photoelectric conversion unit 201 and the second charge holding unit 213 is made low, whereby an electric charge can be held in the second charge holding unit 213.

Further, a dark current component generated by each charge holding unit is held in the second charge holding unit 213, and in a circuit at the subsequent stage, a differential process is performed on a signal corresponding to an electric charge held in the first charge holding unit 203 and a signal corresponding to an electric charge held in the second charge holding unit 213, whereby an image with low noise can be obtained.

In the present exemplary embodiment, in a single frame period, transfer from the photoelectric conversion unit 201 to the first charge holding unit 203 is performed only twice, but may be performed three or more times.

In the present exemplary embodiment, as an example, a case has been illustrated where two charge holding units are provided for a single photoelectric conversion unit. Alternatively, three or more charge holding units may be provided for a single photoelectric conversion unit. The same applies to the following exemplary embodiments.

Figure 5:
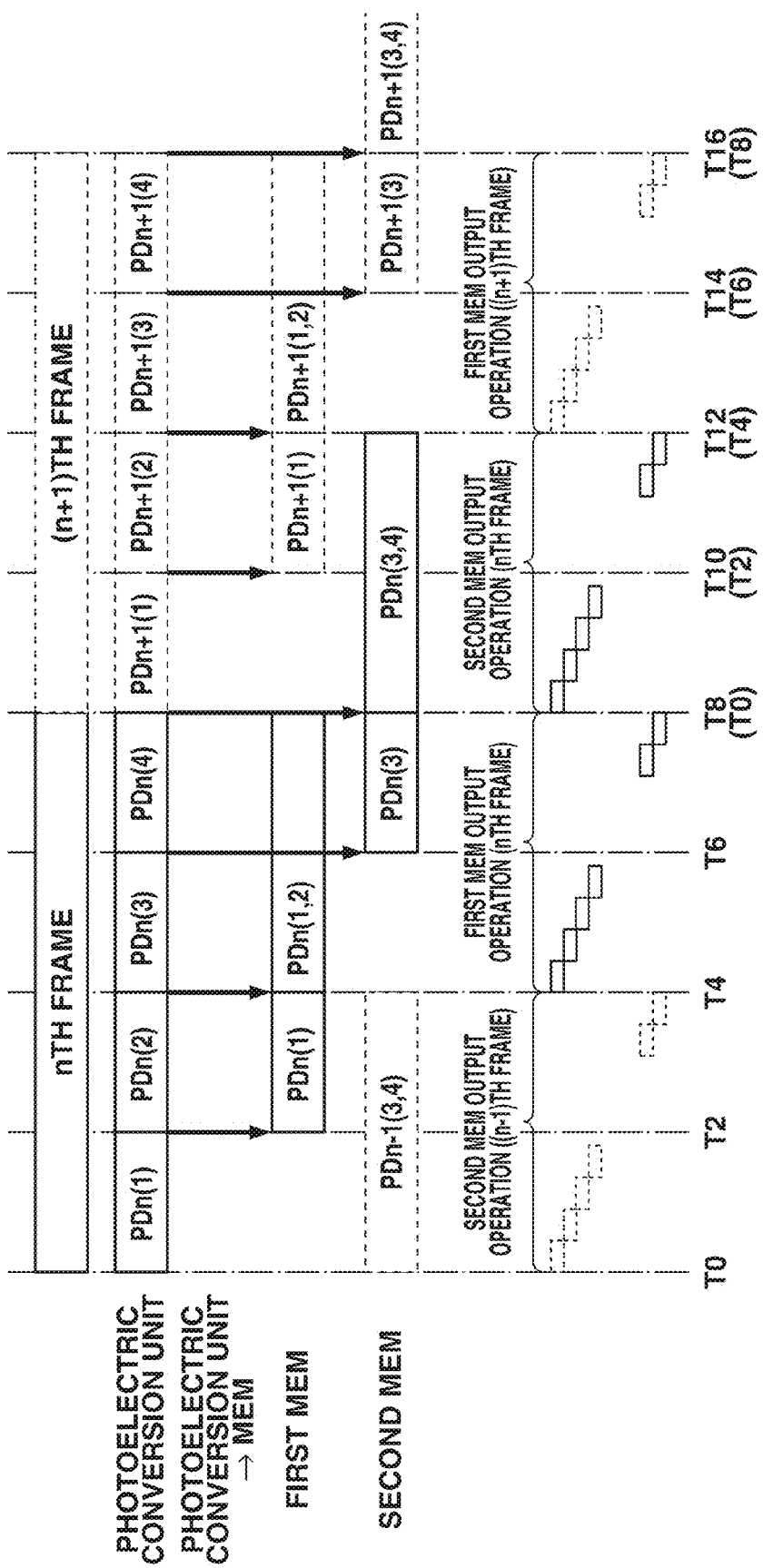
FIG. 5 is a conceptual diagram of driving.
Figure 6:
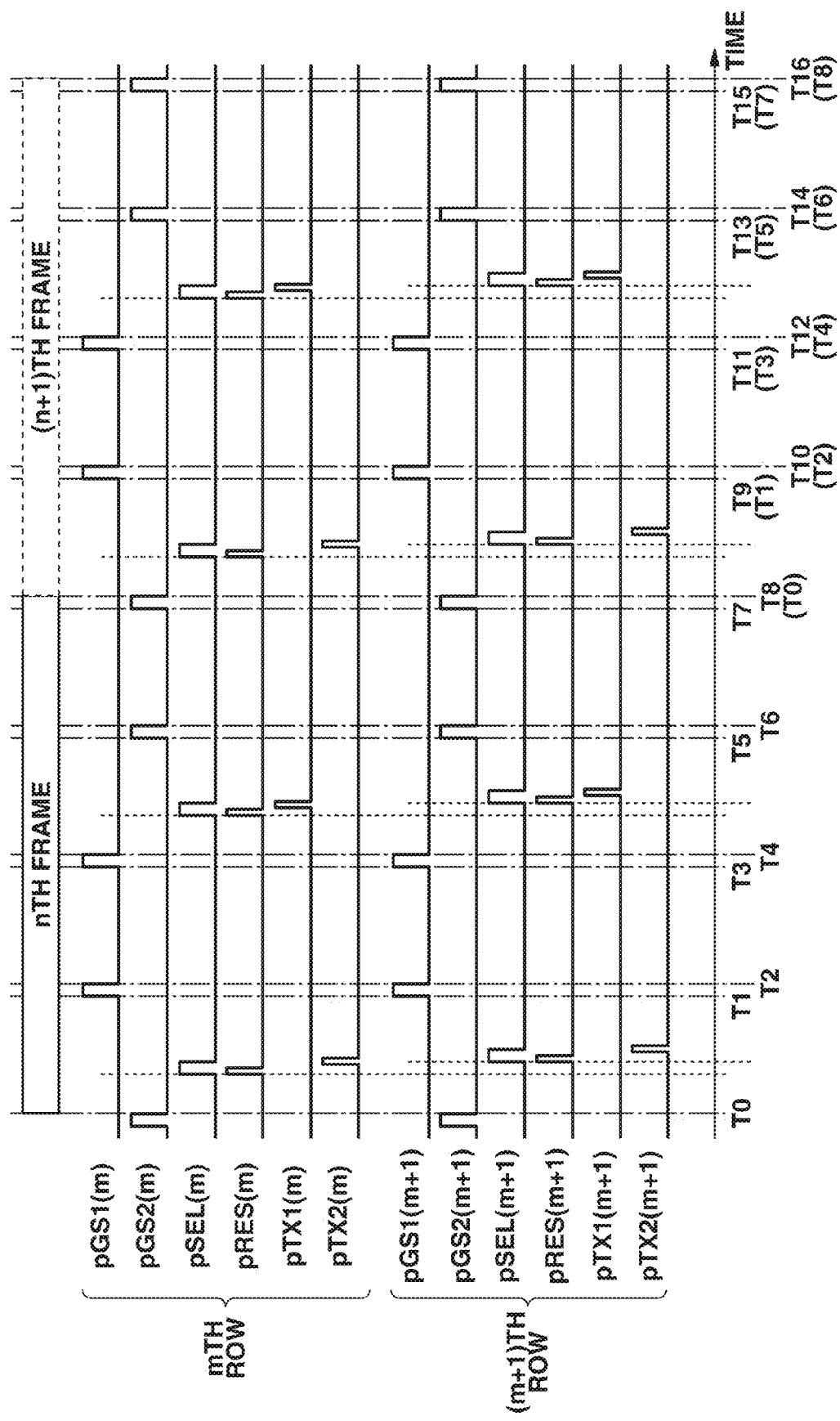
FIG. 6 is a diagram of driving pulses.

With reference to FIGS. 5 and 6, a description is given of a driving method for driving an imaging apparatus according to another example of the present exemplary embodiment. FIG. 5 is a conceptual diagram of driving illustrating the outline of the driving method for driving the imaging apparatus according to another example of the present exemplary embodiment. The differences between the present example and the above described example are described.

In the first exemplary embodiment, electric charges accumulated in the photoelectric conversion unit 201 are transferred to the first charge holding unit 203 multiple times, and the transferred electric charges are added together by and held in the first charge holding unit 203. The present exemplary embodiment is different from the first exemplary embodiment in that in addition to the operation according to the first exemplary embodiment, further, an operation of transferring electric charges accumulated in the photoelectric conversion unit 201 to the second charge holding unit 213 multiple times, adding the transferred electric charges together by the second charge holding unit 213, and holding electric charges obtained by the addition in the second charge holding unit 213 is performed.

That is, the present exemplary embodiment is characterized by including an operation in which in the state where an electric charge is held in the other charge holding unit (a second charge holding unit), a second transfer unit transfers an electric charge from the photoelectric conversion unit to the second charge holding unit (a second transfer operation). The present exemplary embodiment is described by focusing on the differences from the first exemplary embodiment.

In FIG. 5, a period T0-T8 is a period corresponding to an nth frame, and a period T8-T16 is a period corresponding to an (n+1)th frame.

At a time T0, the accumulation of electric charges generated by the photoelectric conversion unit 201 is started, and the period corresponding to the nth frame starts. At the time T0, in the second charge holding unit 213, electric charges (PDn-1(3,4)) for generating an image of an (n−1)th frame are held.

In a period T0-T4, signals, of pixels in respective pixel rows, corresponding to the electric charges PDn-1(3,4) held in the second charge holding unit 213 are output sequentially row by row.

At a time T2, electric charges PDn(1) generated by the photoelectric conversion unit 201 in a period T0-T2 are transferred to the first charge holding unit 203 collectively in all the pixels.

At a time T4, electric charges PDn(2) generated by the photoelectric conversion unit 201 in a period T2-T4 are transferred to the first charge holding unit 203 collectively in all the pixels. This transfer is performed in the state where the electric charges PDn(1) transferred at the time T2 are held (the first transfer operation). Then, in the first charge holding unit 203, the amount of electric charge obtained by adding together the electric charges PDn(1) transferred at the time T2 and the electric charges PDn(2) transferred at the time T4 is held.

At a time T6, electric charges PDn(3) generated by the photoelectric conversion unit 201 in a period T4-T6 are transferred to the second charge holding unit 213 collectively in all the pixels. Then, the photoelectric conversion unit 201 starts accumulating electric charges generated after that. At this time, the transfer is performed in the state where electric charges are not held in the second charge holding unit 213. This operation is performed between the first transfer operation and the second transfer operation described below.

At a time T8, electric charges PD4(n) generated by the photoelectric conversion unit 201 in a period T6-T8 are transferred to the second charge holding unit 213 collectively in all the pixels. This transfer is performed in the state where the electric charges PDn(3) transferred at the time T6 are held in the second charge holding unit 213 (the second transfer operation). Then, the amount of electric charge obtained by adding together the electric charges PDn(3) transferred at the time T6 and the electric charges PDn(4) transferred at the time T8 is held.

The second transfer operation is performed after the first transfer operation. Further, the electric charges held in the second charge holding unit 213 in a period T8-T12 are transferred.

At the time T8, the transfer of the electric charges from the photoelectric conversion unit 201 to the second charge holding unit 213 is completed, and thus the transfer of electric charges for generating an image of the nth frame is completed. Simultaneously, the period corresponding to the (n+1)th frame starts. The photoelectric conversion unit 201 starts accumulating electric charges for generating an image of the (n+1)th frame.

In a period T4-T8, signals, of pixels in respective pixel rows, corresponding to the electric charges held in the first charge holding unit 203 are output sequentially row by row. In a period T8-T12, signals, of pixels in respective pixel rows, corresponding to the electric charges held in the second charge holding unit 213 are output sequentially row by row. After the signals based on the electric charges held in the first charge holding unit 203 are read out sequentially in the order of rows, the signals based on the electric charges held in the second charge holding unit 213 are read out sequentially in the order of rows.

FIG. 6 is a diagram illustrating examples of specific driving pulses for achieving the operation in FIG. 5. With reference to FIG. 6, the operation of the imaging apparatus is described.

At a time T0, a driving pulse pGS2 changes to the L-level, whereby the second transfer unit 212 is switched to an off state. Then, the accumulation of electric charges generated by the photoelectric conversion unit 201 is started.

In a period T0-T2, the operation of sequentially outputting signals based on electric charges held in the second charge holding unit 213 is performed in each pixel row, whereby the output of signals for generating an image of an (n−1)th frame ends.

At a time T1, a driving pulse pGS1 changes to the H-level, whereby the first transfer unit 202 is switched to an on state. At a time T2, the driving pulse pGS1 changes to the L-level, whereby the first transfer unit 202 is switched to an off state. By this operation, electric charges PDn(1) generated by the photoelectric conversion unit 201 in the period T0-T2 are transferred to the first charge holding unit 203 collectively in all the pixels. Further, the operation in the period T0-T2 is performed in the state where electric charges are not held in the first charge holding unit 203.

When the first transfer unit 202 is switched to an off state at the time T2, the photoelectric conversion unit 201 restarts accumulating electric charges.

At a time T3, the driving pulse pGS1 changes to the H-level, whereby the first transfer unit 202 is switched to an on state. At a time T4, the driving pulse pGS1 changes to the L-level, whereby the first transfer unit 202 is switched to an off state (the first transfer operation).

In a period T4-T8, the operation of sequentially outputting signals based on the electric charges held in the first charge holding unit 203 is performed in each pixel row, whereby the output of signals corresponding to the electric charges generated by the photoelectric conversion unit 201 in a period T0-T4 ends.

At a time T5, the driving pulse pGS2 changes to the H-level, whereby the second transfer unit 212 is switched to an on state. At a time T6, the driving pulse pGS2 changes to the L-level, whereby the second transfer unit 212 is switched to an off state.

Electric charges (PDn(3) in FIG. 5) generated by the photoelectric conversion unit 201 in a period T4-T6 are transferred to the second charge holding unit 213 collectively in all the pixels. This operation is performed in the state where electric charges are not held in the second charge holding unit 213.

At a time T7, the driving pulse pGS2 changes to the H-level, whereby the second transfer unit 212 is switched to an on state. At a time T8, the driving pulse pGS2 changes to the L-level, whereby the second transfer unit 212 is switched to an off state.

Electric charges PDn(4) generated by the photoelectric conversion unit 201 in a period T6-T8 are transferred to the second charge holding unit 213 collectively in all the pixels (the second transfer operation).

Through the above operation, the reading out of electric charges for generating an image of an nth frame to the charge holding units ends.

Then, in a period T8-T12, the operation of sequentially outputting signals based on the electric charges held in the second charge holding unit 213 is performed in each pixel row. Through the operation, the output of signals based on electric charges for generating the image of the nth frame ends.

Then, operations are performed such that the time T8 corresponds to the time T0, a time T9 corresponds to the time T1, a time T10 corresponds to the time T2, a time T11 corresponds to the time T3, a time T12 corresponds to the time T4, a time T13 corresponds to the time T5, a time T14 corresponds to the time T6, a time T15 corresponds to the time T7, and a time T16 corresponds to the time T8.

In the present exemplary embodiment, an electric charge generated in a period corresponding to the first half part of a period corresponding to each frame is held in the first charge holding unit 203, and an electric charge generated in the second half part is held in the second charge holding unit 213. After the output of a signal based on the electric charge held in the first charge holding unit 203 ends in all the rows, a signal based on the electric charges held in the second charge holding unit 213 is output.

The configuration according to the present exemplary embodiment can be suitably implemented in a case where signals at different times in the same frame period are subjected to image processing for motion detection.

Figure 7:
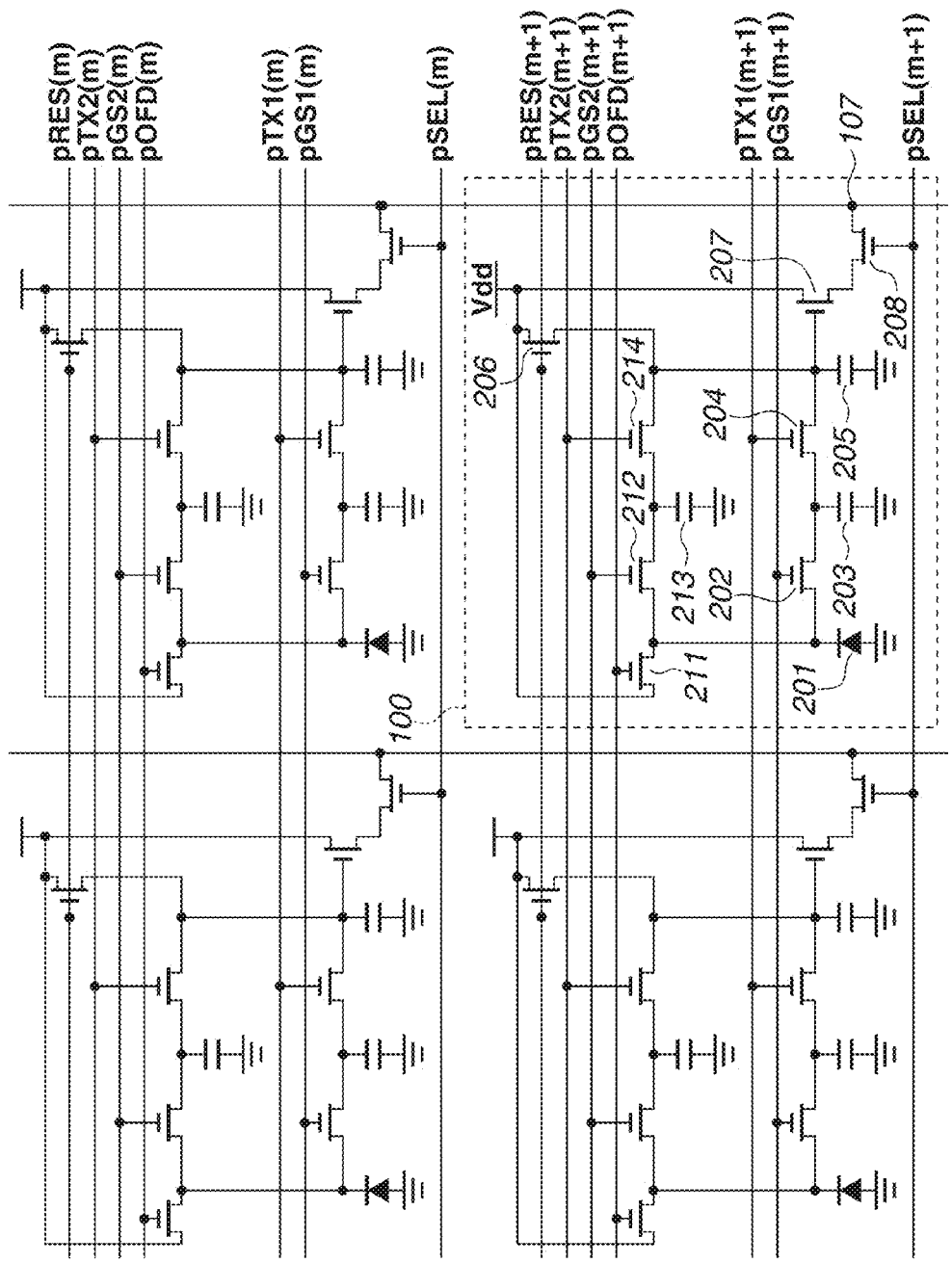
FIG. 7 is a circuit diagram of pixels.
Figure 8:
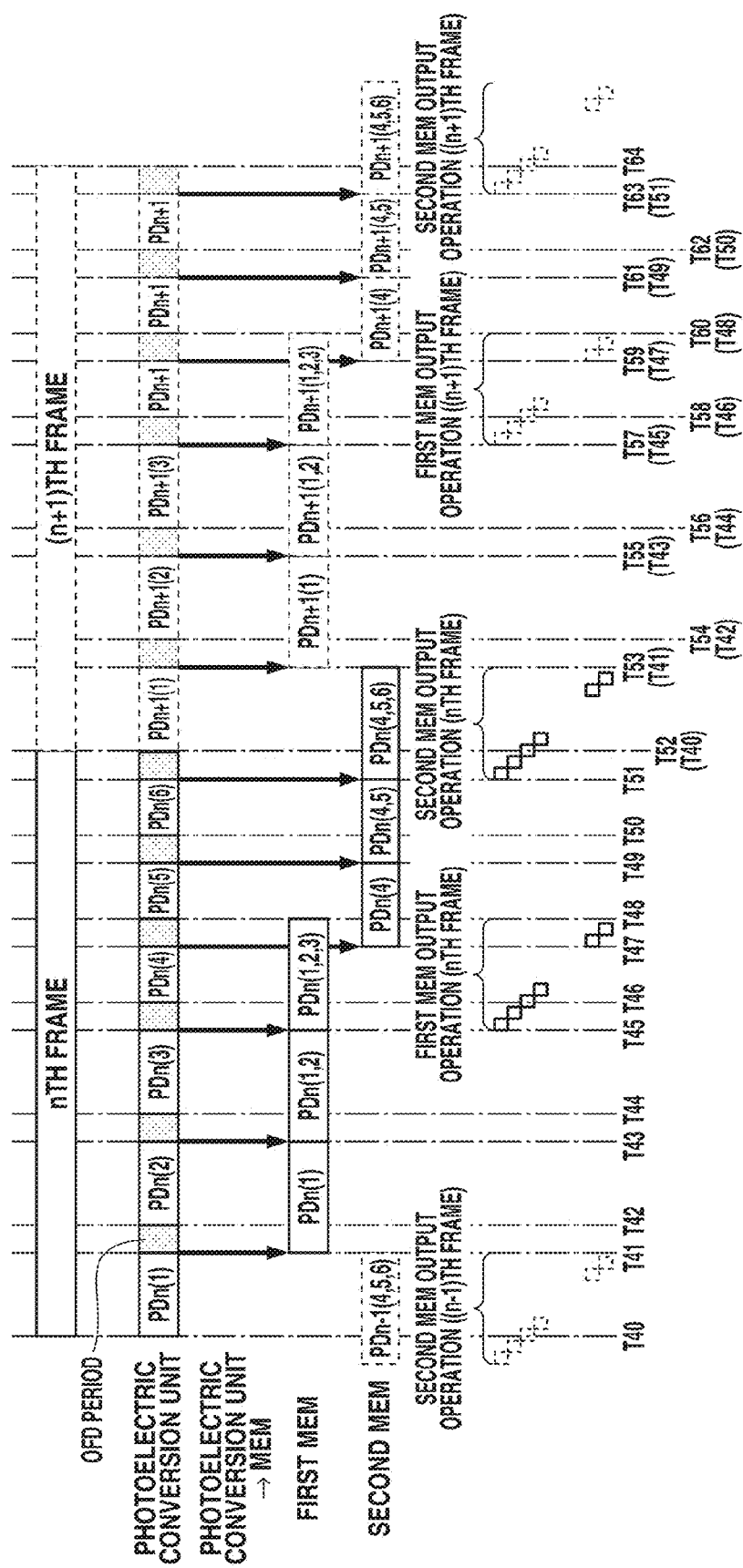
FIG. 8 is a conceptual diagram of driving.
Figure 9:
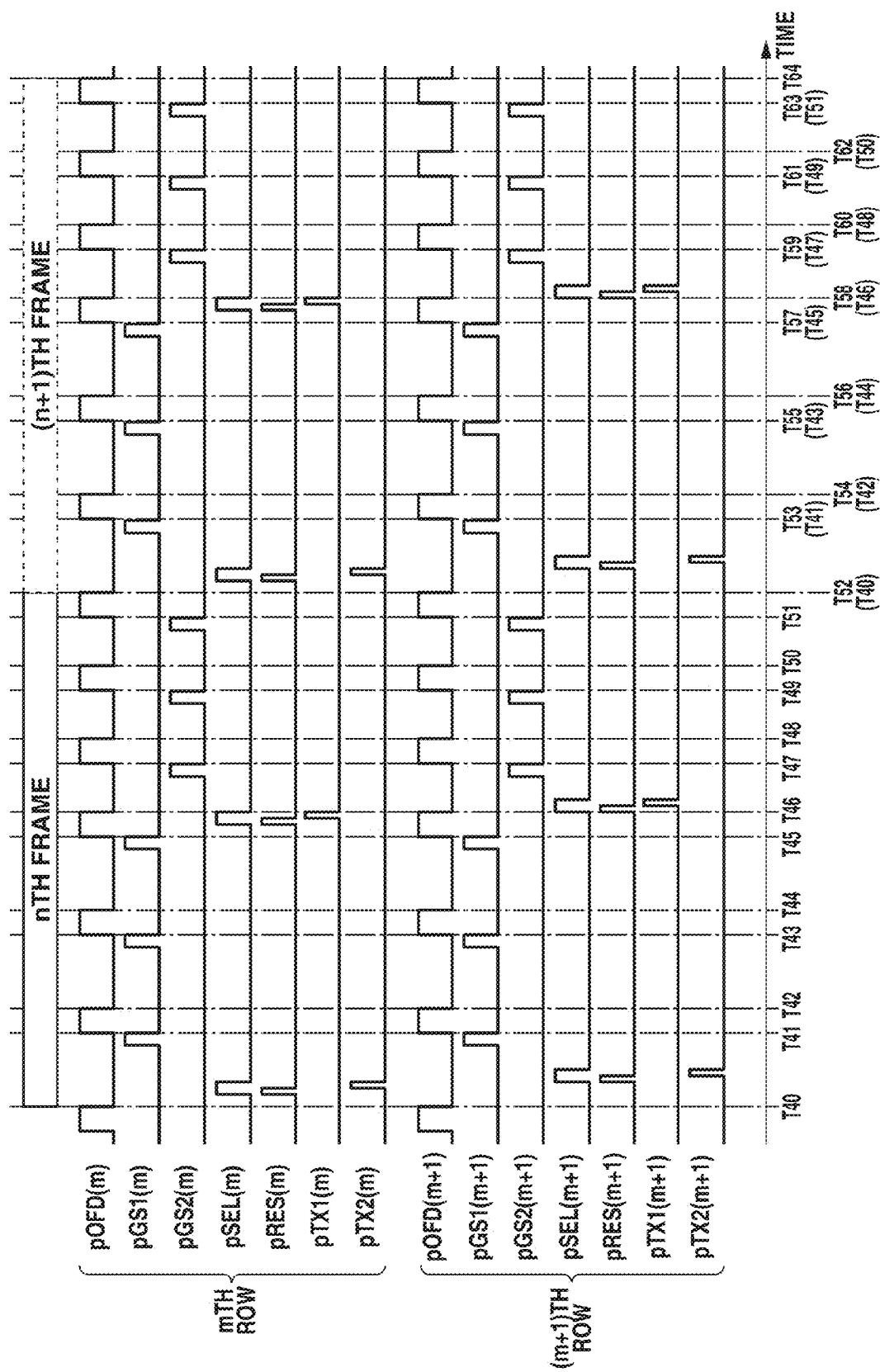
FIG. 9 is a diagram of driving pulses.

With reference to FIGS. 7 to 9, an imaging apparatus according to a second exemplary embodiment is described. The present exemplary embodiment is different from the first exemplary embodiment in that the electric charge accumulation period, in the photoelectric conversion unit 201, of an electric charge to be held in the first charge holding unit 203 is longer than the electric charge accumulation period, in the photoelectric conversion unit 201, of an electric charge to be held in the second charge holding unit 213.

That is, in the present exemplary embodiment, the length of the period in which an electric charge to be transferred to one of the charge holding units (a first charge holding unit) is accumulated in one photoelectric conversion unit is different from the length of the period in which an electric charge to be transferred to the other charge holding unit (a second charge holding unit) is accumulated in the one photoelectric conversion unit. A description is given below by focusing on the differences from the first exemplary embodiment. In the present exemplary embodiment, a case is described where an overflow drain transistor (hereinafter, an "OFD transistor") for resetting an electric charge of the photoelectric conversion unit is provided. The OFD transistor may not necessarily need to be provided.

FIG. 7 is an equivalent circuit diagram of pixels 100 according to the present exemplary embodiment. To the gate of an OFD transistor 211, a driving pulse pOFD is supplied, and the OFD transistor 211 is controlled to be an on state or an off state by the driving pulse pOFD.

Next, with reference to FIG. 8, a description is given of temporal changes in the transfer and the holding of electric charges generated by a photoelectric conversion unit of the imaging apparatus according to the present exemplary embodiment, and the state where signals are read out.

In the first exemplary embodiment, the generation of an electric charge by the photoelectric conversion unit is controlled by transferring an electric charge from the photoelectric conversion unit. In the present exemplary embodiment, it is possible to control the start of an electric charge generation period in the photoelectric conversion unit at any time, using the OFD transistor 211 separately from the transfer of an electric charge.

In FIG. 8, a period T40-T52 is a period corresponding to an nth frame, and a period T52-T64 is a period corresponding to an (n+1)th frame.

In FIG. 8, at a time T40, the OFD transistor 211 is switched from an on state to an off state, and the generation of electric charges for generating an image of the nth frame is started by the photoelectric conversion unit 201. At the time T40, in the second charge holding unit 213, electric charges (PDn-1(4,5,6)) for generating an image of an (n−1)th frame are held.

At a time T41, electric charges PDn(1) generated by the photoelectric conversion unit 201 in a period T40-T41 are transferred to the first charge holding unit 203 collectively in all the pixels. This transfer is performed in the state where electric charges are not held in the first charge holding unit 203.

In a period T41-T42, the OFD transistor 211 is switched to an on state, whereby electric charges generated by the photoelectric conversion unit 201 is discharged to the power supply Vdd. Hereinafter, the operation of turning on the OFD transistor 211 to discharge electric charges is referred to as an "OFD operation".

When the OFD operation ends at a time T42, the accumulation of electric charges generated by the photoelectric conversion unit 201 is started.

At a time T43, electric charges PDn(2) generated by the photoelectric conversion unit 201 in a period T42-T43 are transferred to the first charge holding unit 203 collectively in all the pixels (the first transfer operation).

Then, in a period T43-T44, an OFD operation is performed.

When the OFD operation ends at a time T44, the accumulation of electric charges in the photoelectric conversion unit 201 is started.

At a time T45, electric charges PDn(3) generated by the photoelectric conversion unit 201 in a period T44-T45 are transferred to the first charge holding unit 203 collectively in all the pixels. This operation is similar to the first transfer operation, but different from the first transfer operation in a strict sense. This operation is different from the first transfer operation in that in the state where the electric charges transferred by the first transfer operation are held in the first charge holding unit 203, electric charges are further transferred to the first charge holding unit 203. This operation, however, is similar to the first transfer operation in that in the state where electric charges are held in the first charge holding unit 203, electric charges are transferred to the first charge holding unit 203. Thus, in the following description, if it is not necessary to describe the difference, both operations will occasionally be referred to as the "first transfer operation". A period T45-T46 is an OFD period.

In a period T45-T51 from the time T45 to a time T51 of when the operation of outputting signals based on electric charges held in the second charge holding unit 213 is started, the electric charges held in the first charge holding unit 203 are transferred to the FD 205.

When the OFD period ends at a time T46, the accumulation of electric charges generated by the photoelectric conversion unit 201 is started. At a time T47, electric charges PDn(4) generated by the photoelectric conversion unit 201 in a period T46-T47 are transferred to the second charge holding unit 213 collectively in all the pixels. This transfer operation is performed in the state where electric charges are not held in the second charge holding unit 213.

Then, a period T47-T48 is an OFD period. When the OFD period ends at a time T48, the accumulation of electric charges generated by the photoelectric conversion unit 201 is started.

At a time T49, electric charges PDn(5) generated by the photoelectric conversion unit 201 in a period T48-T49 are transferred to the second charge holding unit 213 collectively in all the pixels (the second transfer operation).

Then, a period T49-T50 is an OFD period. When the OFD period ends at a time T50, the accumulation of electric charges generated by the photoelectric conversion unit 201 is started. At a time T51, electric charges PDn(6) generated by the photoelectric conversion unit 201 in a period T50-T51 are transferred to the second charge holding unit 213 collectively in all the pixels. Similarly to the operation in the period T45-T46, this operation is also different from the second transfer operation in a strict sense. However, in the following description, similarly, this operation will occasionally be referred to as the "second transfer operation".

In a period T51-T57 from the time T51 to a time T57 of when an output operation for the (n+1)th frame is started, signals based on the electric charges held in the second charge holding unit 213 are output.

This is the operation according to the present exemplary embodiment.

The present exemplary embodiment is similar to the first exemplary embodiment in that electric charges generated in different periods are transferred to the first charge holding unit 203 and the second charge holding unit 213 multiple times and held in the first charge holding unit 203 and the second charge holding unit 213. The present exemplary embodiment is different from the first exemplary embodiment in that the length of the periods in which an electric charge to be transferred by a single transfer operation is accumulated in the photoelectric conversion unit 201 differs from each other. Specifically, the period in which an electric charge to be transferred by a single transfer operation to and held in the first charge holding unit 203 is accumulated in the photoelectric conversion unit 201 is longer than the period in which an electric charge to be transferred by a single transfer operation to and held in the second charge holding unit 213 is accumulated in the photoelectric conversion unit 201. More specifically, there is a relationship as follows: each of the periods T40-T41, T42-T43, and T44-T45>each of the periods T46-T47, T48-T49, and T50-T51.

That is, electric charges to be accumulated for a long time are transferred multiple times to and held in the first charge holding unit 203, and electric charges to be accumulated for a time shorter than the long time are transferred multiple times to and held in the second charge holding unit 213.

Through such an operation, in addition to the effects described in the first exemplary embodiment, it is possible to capture an image with an extended dynamic range.

Specific examples of such an operation are described below.

FIG. 9 is a diagram of driving pulses of a third exemplary embodiment. Portions similar to those in FIG. 8 are designated by the same numerals and are not described in detail here.

At a time T40, a driving pulse pOFD changes to the L-level, whereby an OFD period ends. The accumulation of electric charges for generating an image of an nth frame is started by the photoelectric conversion unit 201.

At a time T41, a driving pulse pGS1 changes from the H-level to the L-level, whereby the first transfer unit 202 is switched to an on state and then to an off state.

Electric charges PDn(1) generated by the photoelectric conversion unit 201 in a period T40-T41 are transferred to the first charge holding unit 203. At a time T41, the driving pulse pOFD changes to the H-level, whereby an OFD period starts. Then, at a time T42, the OFD period ends, and the photoelectric conversion unit 201 restarts accumulating electric charges.

Further, in the period T40-T41, the selection transistor 208, the reset transistor 206, and the fourth transfer unit 214 are controlled sequentially in the order of rows, whereby signals based on electric charges for generating an image of an (n−1)th frame is read out.

Electric charges generated by the photoelectric conversion unit 201 in a period T42-T43 are transferred to the first charge holding unit 203 (the first transfer operation). At a time T43, the driving pulse pOFD changes to the H-level, whereby an OFD period starts. Then, at a time T44, the OFD period ends, and the photoelectric conversion unit 201 restarts accumulating electric charges.

Electric charges generated by the photoelectric conversion unit 201 in a period T44-T45 are transferred to the first charge holding unit 203 (the first transfer operation). At a time T45, the driving pulse pOFD changes to the H-level, whereby an OFD period starts. Then, at a time T46, the OFD period ends, and the photoelectric conversion unit 201 restarts accumulating electric charges.

At the time T45, if the driving pulse pGS1 changes to the L-level, and the first transfer unit 202 is turned off, the operation of outputting signals based on the electric charges held in the first charge holding unit 203 is performed. This operation is performed by sequentially controlling the selection transistor 208, the reset transistor 206, and the fourth transfer unit 214 in the order of rows in a period T45-T48.

If the OFD period ends at a time T46, the photoelectric conversion unit 201 restarts accumulating electric charges.

At a time T47, a driving pulse pGS2 changes from the H-level to the L-level, whereby electric charges are transferred from the photoelectric conversion unit 201 to the second charge holding unit 213 via the second transfer unit 212.

Electric charges generated by the photoelectric conversion unit 201 in a period T46-T47 are transferred to the second charge holding unit 213.

At a time T47, the driving pulse pOFD changes to the H-level, whereby an OFD period starts. When the OFD period ends at a time T48, the photoelectric conversion unit 201 restarts accumulating electric charges. Then, this operation is performed multiple times until a time T52.

Then, at a time T51, the driving pulse pGS2 changes to the L-level, whereby the transfer of electric charges for generating the image of the nth frame ends. Then, the operation of outputting signals based on these electric charges is performed.

In the present exemplary embodiment, an electric charge accumulated for a long period of time is held in the first charge holding unit 203, and an electric charge accumulated for a period of time shorter than the long period of time is held in the second charge holding unit 213. According to such an operation, it is possible to extend a dynamic range.

In the present exemplary embodiment, both the first charge holding unit 203 and the second charge holding unit 213 transfer electric charges multiple times in a period corresponding to each frame. Alternatively, either one of the first charge holding unit 203 and the second charge holding unit 213 may transfer electric charges multiple times. Yet alternatively, the configuration may be such that electric charges accumulated for, for example, a long accumulation period, a short accumulation period, and a medium accumulation period may be held using three or more charge holding units. Further, in the present exemplary embodiment, in the nth frame, the long accumulation periods start first, and the short accumulation periods start later. This order, however, may be reversed. The same applies to the following exemplary embodiments.

Figure 10:
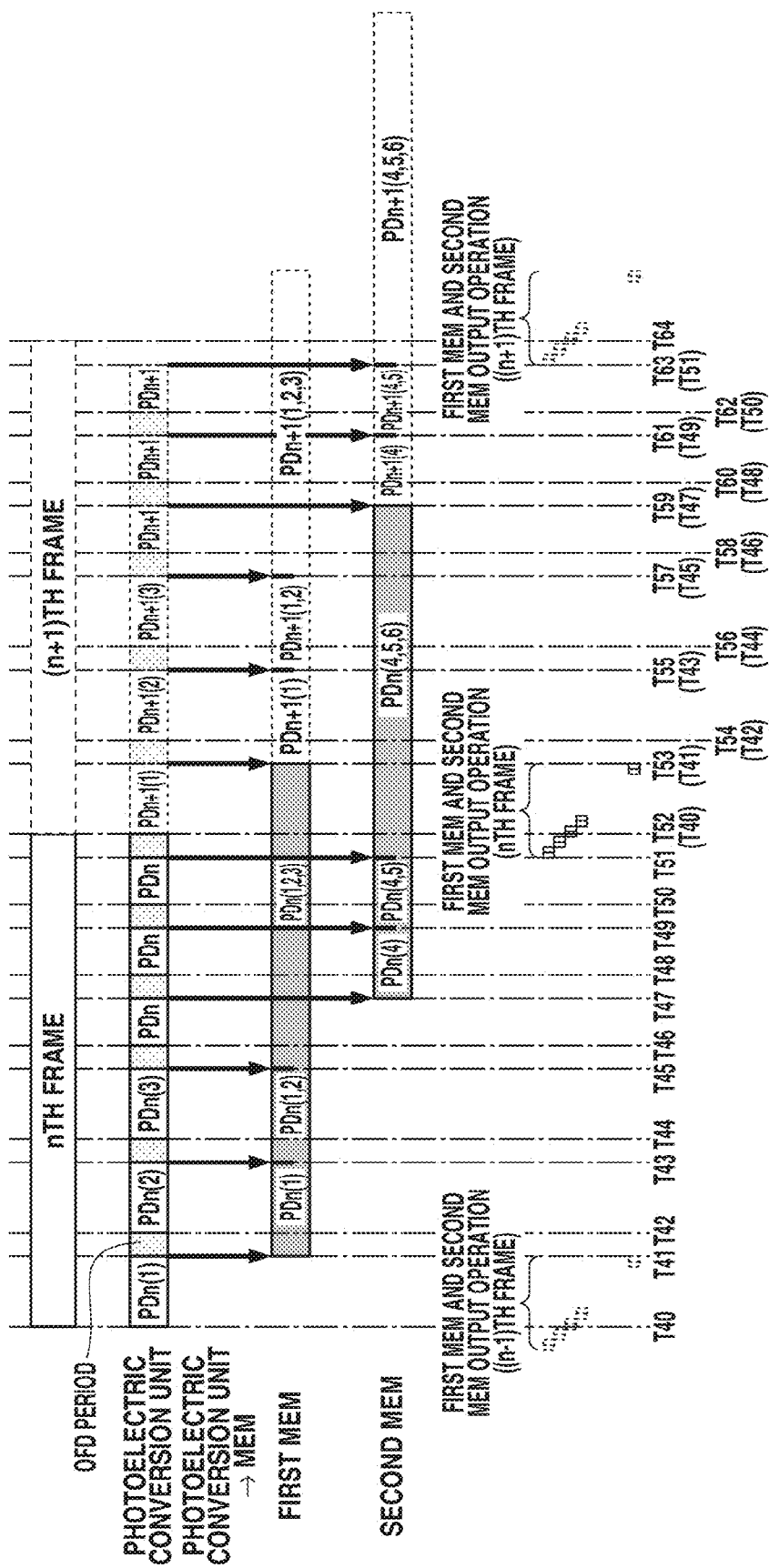
FIG. 10 is a conceptual diagram of driving.

With reference to FIGS. 10 and 11, a driving method for driving an imaging apparatus according to a fourth exemplary embodiment is described. The present exemplary embodiment is different from the third exemplary embodiment in the transfer of electric charges held in the charge holding units to the FD and the operation of outputting signals.

The present exemplary embodiment is different from the third exemplary embodiment in that electric charges held in the first charge holding unit 203 and electric charges held in the second charge holding unit with respect to each pixel row are transferred sequentially, and signals based on these electric charges are read out continuously on a pixel row basis.

With reference to FIG. 10, the differences from the third exemplary embodiment are described. In the present exemplary embodiment, signals based on electric charges held in the first charge holding unit 203 and signals based on electric charges held in the second charge holding unit 213 in a single row selection of each pixel row are read out collectively on a pixel row basis.

Specifically, in a period T51-T53, signals based on electric charges held in the first charge holding unit 203 and signals based on electric charges held in the second charge holding unit 213 are read out.

Next, with reference to a diagram of driving pulses in FIG. 11A, a description is given. FIG. 11B is a diagram of driving pulses particularly illustrating an output operation performed from a time T51 to a time T53 in frame periods. Since FIGS. 11A and 11B are similar drawings, FIGS. 11A and 11B are not distinguished from each other in the following description.

In FIGS. 11A and 11B, the operations of driving pulses pOFD, pGS1, and pGS2 are similar to those in the third exemplary embodiment and therefore are not described here.

The operation is performed as follows. At a time T52, the driving pulse pGS2 changes to the L-level. After the time T52 and in a first period in which a driving pulse pSEL is continuously at the H-level, driving pulses pRES, pTX2, and pTX1 are controlled, whereby electric charges held in the second charge holding unit 213 are transferred to the FD 205. Then, signals based on these electric charges are read out. Then, the FD 205 is reset. Then, electric charges held in the first charge holding unit 203 are transferred to the FD 205, and signals based on these electric charges are read out. This operation is specifically described.

Electric charges generated by the photoelectric conversion unit 201 by the time T51 in FIGS. 11A and 11B are held in each of the first charge holding unit 203 and the second charge holding unit 213.

After the time T51, an output operation for each pixel row is started. An output operation for an mth row is described here. At a time T68, a driving pulse pSEL(m) changes to the H-level, whereby the selection transistor 208 is switched to an on state. Consequently, the mth row is selected, and signals of pixels in the mth row are output.

Next, at a time T70, a driving pulse pRES(m) changes to the H-level, whereby the reset transistor 206 is switched to an on state. Consequently, electric charges of the FD 205 are discharged to the power supply Vdd.

At a time T71, the reset transistor 206 is switched to an off state. In a period T71-T72, a noise signal is output to a circuit at the subsequent stage.

Then, at a time T72, a driving pulse pTX2(m) changes to the H-level, whereby the second transfer unit 212 is switched to an on state. At a time T73, the driving pulse pTX2(m) changes to the L-level. In a period T72-T73, the electric charges held in the second charge holding unit 213 are transferred to the FD 205.

After this transfer, signals based on the electric charges of the second charge holding unit 213 are amplified by a source follower operation of the amplification transistor 207, and the amplified signals are read out to the signal line 107.

Next, at a time T74, a driving pulse pTX1(m) changes the H-level, whereby the first transfer unit 202 is switched to an on state. At a time T75, the driving pulse pTX1(m) changes to the L-level. In a period T74-T75, the electric charges held in the first charge holding unit 203 are transferred to the FD

205. The transfer is performed in the state where the electric charges of the second charge holding unit 213 are held in the FD 205. Thus, the electric charges of the first charge holding unit 203 and the electric charges of the second charge holding unit 213 are added together.

After this transfer, signals obtained by the FD 205 adding together the electric charges of the first charge holding unit 203 and the second charge holding unit 213 are amplified by a source follower operation, and the amplified signals are read out to the signal line 107.

At a time T69, the driving pulse pSEL(m) changes to the L-level, whereby the selection transistor 208 is switched to an off state. Consequently, the selection of the mth row ends.

If the electric charges are transferred from the first charge holding unit 203 to the FD 205 before the electric charges are transferred from the second charge holding unit 213, the FD 205 may become saturated. Thus, transfer from a charge holding unit holding an electric charge accumulated for a short period of time (the second charge holding unit 213) should be performed before transfer from a charge holding unit holding an electric charge accumulated for a long period of time (the first charge holding unit 203). According to this order, it is possible to at least output a correct signal corresponding to an electric charge of a charge holding unit holding an electric charge accumulated for a short period of time. Alternatively, an electric charge of the first charge holding unit 203 and an electric charge of the second charge holding unit 213 may be simultaneously transferred at least in some periods.

Alternatively, in a period T73-T74 between the transfer of the electric charges of the second charge holding unit 213 and the transfer of the electric charges of the first charge holding unit 203, the driving pulse pRES(m) may change to the H-level for the operation of resetting the FD 205.

The operation of outputting signals of the nth frame needs to end in the period after the transfer of the electric charges to the second charge holding unit 213 ends at the time T51, and before electric charges for an (n+1)th frame are transferred to the first charge holding unit 203 for the first time at the time T53.

Thus, if electric charge accumulation for a long period of time in the photoelectric conversion unit 201 is performed in the first half part of a period corresponding to each frame, it is possible to ensure a longer time until electric charges for the (n+1)th frame are transferred for the first time. This can provide plenty of time to perform the output operation.

In the present exemplary embodiment, as in the third exemplary embodiment, electric charges held in the first charge holding unit 203 and the second charge holding unit 213 in a single row selection are output, whereby it is possible to make the output operation of each charge holding unit shorter than in a case where electric charges held in the first charge holding unit 203 and the second charge holding unit 213 in different selection periods are output.

With reference to FIGS. 12 and 13, a driving method for driving an imaging apparatus according to a fifth exemplary embodiment is described.

The present exemplary embodiment is different from the fourth exemplary embodiment in the combination of electric charge accumulation periods of an electric charge held in the first charge holding unit 203 and an electric charge held in the second charge holding unit 213. In the above exemplary embodiments, electric charges accumulated in each of the first charge holding unit 203 and the second charge holding unit 213 are generated by the photoelectric conversion unit 201 in a continuous period. In contrast, the present exemplary embodiment is characterized by alternately and repeatedly transferring electric charges to the first charge holding unit and the second charge holding unit. More specifically, this is the operation of alternately and repeatedly performing the first transfer operation and the second transfer operation in the state where electric charges are held in the two charge holding units.

FIG. 12 is a conceptual diagram illustrating the driving method for driving the imaging apparatus according to the present exemplary embodiment.

In FIG. 12, electric charges PDn(1) generated by the photoelectric conversion unit 201 in a period T0-T1 (hereinafter, a "period $\Delta T1$"), electric charges PDn(3) generated by the photoelectric conversion unit 201 in a period T2-T3 (hereinafter, a "period $\Delta T3$"), and electric charges PDn(5) generated by the photoelectric conversion unit 201 in a period T4-T5 (hereinafter, a "period $\Delta T5$") are transferred to the first charge holding unit 203.

Then, electric charges PDn(2) generated by the photoelectric conversion unit 201 in a period T1-T2 (hereinafter, a "period $\Delta T2$") and electric charges PDn(4) generated by the photoelectric conversion unit 201 in a period T3-T4 (hereinafter, a "period $\Delta T4$") are transferred to the second charge holding unit 213.

Each of the periods $\Delta T1$, $\Delta T3$, and $\Delta T5$ corresponds to long accumulation periods of the photoelectric conversion unit 201, and the lengths of the periods $\Delta T1$, $\Delta T3$, and $\Delta T5$ are equal to each other ($\Delta T1 = \Delta T3 = \Delta T5$). Further, each of the periods $\Delta T2$ and $\Delta T4$ corresponds to short accumulation periods of the photoelectric conversion unit 201, and the lengths of the periods $\Delta T2$ and $\Delta T4$ are equal to each other ($\Delta T2 = \Delta T4$).

The electric charges generated in the periods $\Delta T1$, $\Delta T3$, and $\Delta T5$ are added together by the first charge holding unit 203, and then, electric charges obtained by the addition are held in the first charge holding unit 203. This processing is performed using the first transfer operation described above.

Similarly, the electric charges generated in the periods $\Delta T2$ and $\Delta T4$ are added together by the second charge holding unit 213, and then, electric charges obtained by the addition are held in the second charge holding unit 213. This processing is performed using the second transfer operation described above.

The period in which the total electric charge to be ultimately held in the first charge holding unit 203 is accumulated in the photoelectric conversion unit 201 is defined as a first period. In the present exemplary embodiment, the first period is a period T0-T5. Further, the period in which the total electric charge to be ultimately held in the second charge holding unit 213 is accumulated in the photoelectric conversion unit 201 is defined as a second period. In this example, the second period is a period T1-T4.

At this time, a start time T0 of the first period is different from a start time T1 of the second period. Further, an end time T5 of the first period is different from an end time T4 of the second period. Meanwhile, a center time between the start time T0 and the end time T5 of the first period coincides with a center time between the start time T1 and the end time T4 of the second period. In FIG. 12, a time center is indicated by a filled circle.

In the present exemplary embodiment, temporal centers (center times) of signal charges held in these two holding units coincide with each other.

Next, with reference to FIG. 13, the timing of specific driving pulses in FIG. 12 is described. The differences from the above described exemplary embodiments are mainly described.

At a time T0, a driving pulse pGS1 changes to the L-level, and the accumulation of electric charges for an nth frame period in the photoelectric conversion unit 201 is started.

At a time T1, the driving pulse pGS1 changes to the H-level, whereby electric charges generated by the photoelectric conversion unit 201 in a period T0-T1 are transferred to the first charge holding unit 203.

Then, when the driving pulse pGS1 changes to the L-level, the photoelectric conversion unit 201 restarts accumulating electric charges. At a time T2, a driving pulse pGS2 changes to the H-level, whereby electric charges generated by the photoelectric conversion unit 201 in a period T1-T2 are transferred to the second charge holding unit 213.

Then, the similar operation is repeated until a time T4. Then, at a time T5, the driving pulse pGS1 changes to the H-level, whereby electric charges are transferred to the first charge holding unit 203 for the third time.

At a time T6, the driving pulse pGS1 changes to the L-level, and the operation of sequentially outputting signals of the nth frame row by row is performed.

Similarly to the above description, a driving pulse pSEL changes to the H-level first, and a row is selected, whereby the operation of outputting signals is started. After a row is selected, the FD 205 is reset by a driving pulse pRES. Next, a driving pulse pTX1 changes to the H-level, whereby the output operation of the first charge holding unit 203 is performed. Then, the driving pulse pRES changes to the H-level, whereby the FD 205 is reset. After the reset, a driving pulse pTX2 changes to the H-level, whereby the output operation of the second charge holding unit 213 is performed.

The driving pulse pRES changes to the H-level in the period between the period of the driving pulse pTX1 in the H-level and the period of the driving pulse pTX2 in the H-level, whereby the FD 205 is reset. Consequently, even in a case where the FD 205 becomes saturated at the time when electric charges of the first charge holding unit 203 are transferred, the FD 205 is reset after that. Thus, it is possible to output electric charges of the second charge holding unit 213.

A description is given by focusing on the driving pulses pGS1 and pGS2 in the nth frame.

At the time T1, the driving pulse pGS1 changes to the H-level, whereby electric charges to the first charge holding unit 203 are transferred. Then, at the time T2, the driving pulse pGS2 changes to the H-level, whereby electric charges to the second charge holding unit 213 is transferred.

Then, at the end of the period corresponding to the nth frame, the driving pulse pGS1 changes to the H-level, whereby electric charges to the first charge holding unit 203 are transferred again. As described above, the times of the transfer of electric charges of the second charge holding unit 213 performed multiple times are present between the times of the transfer of electric charges of the first charge holding unit 203 performed multiple times. That is, the first transfer operation and the second transfer operation are alternately and repeatedly performed in the state where electric charges are held in the two charge holding units.

According to the present exemplary embodiment, when an electric charge accumulated for a long period of time and an electric charge accumulated for a short period of time are combined to create a high dynamic range composite image, it is possible to obtain a natural image with little temporal shifting.

In the present exemplary embodiment, the time centers of the long accumulation period and the short accumulation period coincide with each other. Alternately, in terms of improvement in temporal shifting, an electric charge accumulated for a long period of time and an electric charge accumulated for a short period of time may be alternately transferred.

Figure 14:
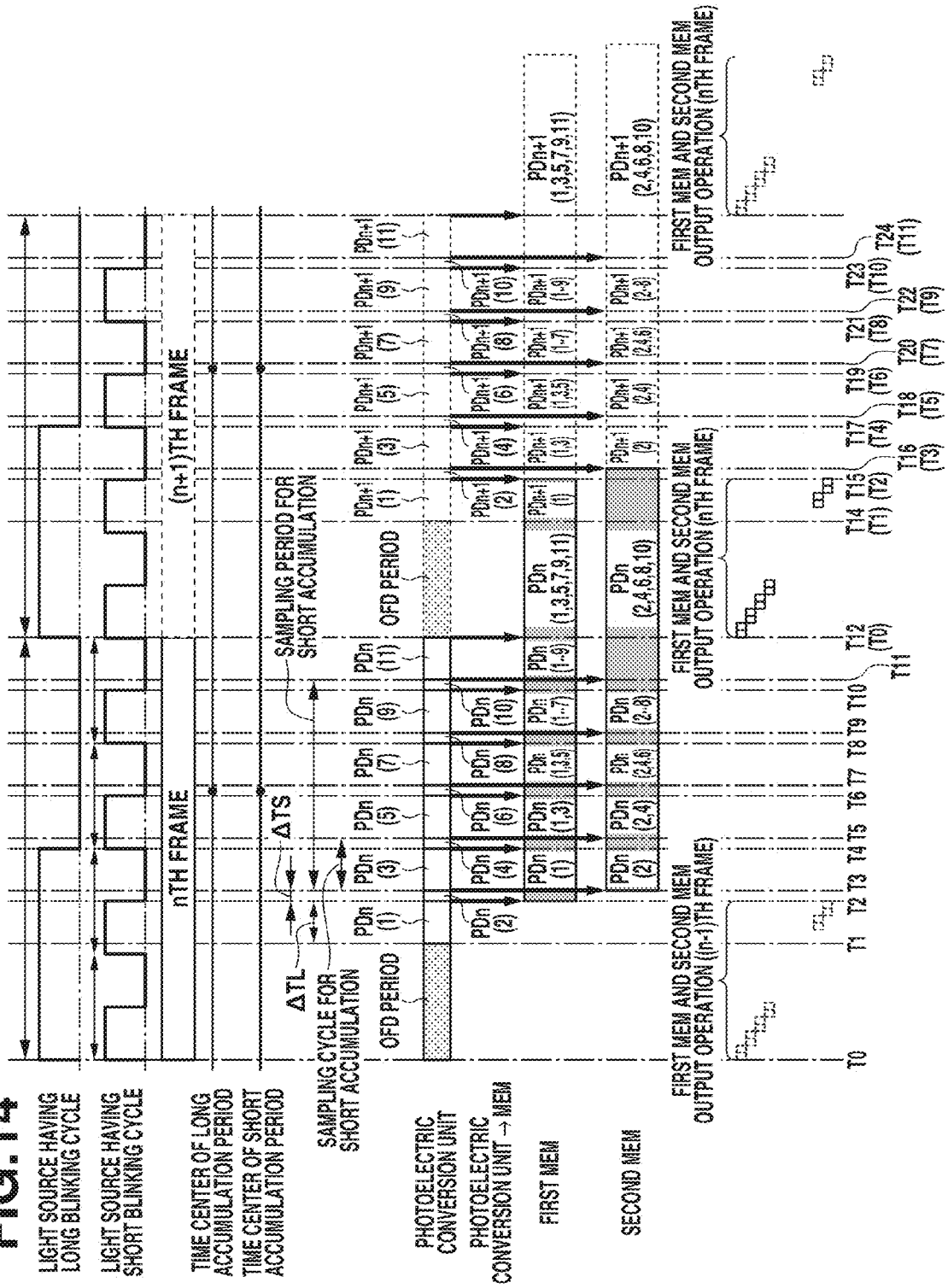
FIG. 14 is a conceptual diagram of driving.

With reference to FIGS. 14 and 15, a driving method for driving an imaging apparatus according to a sixth exemplary embodiment is described. The present exemplary embodiment is similar to the first exemplary embodiment in the circuit configurations of the imaging apparatus, except for pixels, and the operations of transistors, other than pixel circuits. These configurations and operations therefore are not described here. FIG. 14 is a conceptual diagram illustrating the driving method according to the present exemplary embodiment.

In FIG. 14, a period T0-T1 is an OFD period.

In a period T1-T2, electric charges generated by the photoelectric conversion unit 201 are accumulated. At a time T2, the electric charges are transferred to the first charge holding unit 203.

In a period T2-T3, electric charges generated by the photoelectric conversion unit 201 are accumulated. At a time T3, the electric charges are transferred to the second charge holding unit 213. For illustrative purposes, the operation of transferring electric charges generated by the photoelectric conversion unit 201 to either of the charge holding units and holding the electric charges in the charge holding unit is referred to as a "sampling operation".

At this time, the period T1-T2 (referred to as "ΔTL") is longer than the period T2-T3 (referred to as "ΔTS").

Next, in a period T3-T4, electric charges generated by the photoelectric conversion unit 201 are accumulated. At a time T4, the electric charges are transferred to the first charge holding unit 203. The period T3-T4 is equal to the period ΔTL. In a period T4-T5, electric charges generated by the photoelectric conversion unit 201 are accumulated. At a time T5, the electric charges are transferred to the second charge holding unit 213. The period T4-T5 is equal to the period ΔTS.

From this point forward, the operation of transferring electric charges of a period ΔTL to the first charge holding unit 203 and the operation of transferring electric charges of a period ΔTS to the second charge holding unit 213 are repeatedly performed until a time T11. Then, in a period T11-T12, the operation of transferring electric charges of a period ΔTL to the first charge holding unit 203 is performed.

That is, a sampling operation for a long accumulation period is performed six times, and a sampling operation for a short accumulation period is performed five times. The sampling operation for a long accumulation period and the sampling operation for a short accumulation period are alternately performed.

From a time T12, an output operation for an nth frame is performed. The output operation is similar to that in the fifth exemplary embodiment and therefore is not described in detail here. The interval at which a single sampling operation and a next sampling operation are performed is referred to as a "sampling cycle". The period from the start of a sampling operation in a frame to the end of the sampling operation is referred to as a "sampling period".

In the present exemplary embodiment, as illustrated in FIG. 15, the operation of outputting signals is performed in the period in which an OFD operation is performed.

The effects of the present exemplary embodiment are described. The sampling cycle and the sampling period are different from each other, whereby it is possible to handle a wide range of light source cycles to reduce the flicker phenomenon of a light source.

In FIG. 14, a light source having a long blinking cycle is indicated by a rectangular wave. The blinking cycle is almost the same as the frame cycle. In a case where the sampling period for a short accumulation period is short, for example, in a period T9-T11, the sampling operation is performed only in the extinguishing period of the light source having a long blinking cycle as an example. Thus, there is a possibility that the lighting of the light source cannot be recognized. For example, in a case where the red light of a signal is lighting up in a bright daytime, there is a possibility that the capturing of the signal in a short exposure time leads to erroneous detection that the signal is not lighting up. Further, the phase of the blinking of the light source is shifted, which results in a moving image in which the light source blinks. This reduces the image quality.

In contrast, in the present exemplary embodiment, the sampling period is a period T3-T11 and is longer than ½ of the frame cycle. Consequently, at the time T3, it is possible to grasp the lighting state of the blinking light source. That is, even in a case where the phase of the light source is shifted, it is possible to certainly grasp the lighting state of the light source. In the present exemplary embodiment, as an example, a case has been illustrated where the blinking cycle of the light source is the same as the frame cycle. However, in a general case, it is possible to handle up to the cycle of a light source shorter than twice the sampling period for a short accumulation period.

Further, a light source having a short blinking cycle is also indicated by a rectangular wave. The sampling cycle is shortened, whereby it is also possible to handle a light source having a short light source cycle.

Examples of the blinking light source include fluorescent illumination generally using mains electricity, and a signal. In the case of mains electricity, the frequency varies (e.g., 50 Hz or 60 Hz) depending on the region. Further, in the case of a light-emitting diode (LED) message board, the frequency may not be fixed according to type. Thus, with such a configuration that a wide range of light source cycles can be processed, it is possible to reduce flicker on various objects. Further, it is less necessary to match the phases of the blinking of the light source and exposure for a short time. Thus, a lighting detection unit for detecting the blinking of the light source is not required. Further, it is not necessary to match the phase of the blinking of the light source and the phase of the operation of the exposure of the imaging apparatus. This simplifies the circuit configurations. As a result, an inexpensive imaging apparatus is achieved.

Further, similarly to the fifth exemplary embodiment, accumulation for a long period of time and accumulation for a short period of time are alternately performed, and the time centers of the accumulation for a long period of time and the accumulation for a short period of time coincide with each other. Thus, it is possible to obtain similar effects.

In the present exemplary embodiment, to adjust the time centers of long accumulation periods, an OFD period is provided in the period T0-T1. This is because if the period of an output operation for the previous frame is a period T0-T2, the period of the output operation for the previous frame is longer than a period ΔTL of the long accumulation period.

This is because if the cycle of sampling is made smaller to handle flicker as described above, a long accumulation period per time becomes shorter. Thus, it becomes difficult to perform the output operation for the previous frame in time.

However, in a case where the output operation can be performed at high speed, and the period of the output operation can be made shorter than the period ΔTL, an OFD period does not necessarily need to be provided. Further, even if the time centers do not completely coincide with each other, the image quality of a high dynamic range composite image is improved. Thus, an OFD period may be eliminated without changing the output operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-237865, filed Dec. 4, 2015, which is hereby incorporated by reference herein in its entirety.

What is claimed is:

1. A driving method for driving an imaging apparatus comprising a plurality of pixels disposed in a matrix, and each pixel including:
    a photoelectric conversion unit;
    at least two charge holding units each configured to hold an electric charge generated by the photoelectric conversion unit, the at least two charge holding units including a first charge holding unit and a second charge holding unit;
    a floating diffusion;
    a first transfer unit configured to transfer an electric charge generated by the photoelectric conversion unit from the photoelectric conversion unit to the first charge holding unit;
    a second transfer unit configured to transfer an electric charge generated by the photoelectric conversion unit from the photoelectric conversion unit to the second charge holding unit;
    a third transfer unit configured to transfer an electric charge from the first charge holding unit to the floating diffusion;
    a fourth transfer unit configured to transfer an electric charge from the second charge holding unit to the floating diffusion; and
    an amplification transistor configured to output a signal based on at least one of an electric charge held in the first charge holding unit and an electric charge held in the second charge holding unit,
    the driving method comprising:
    performing a plurality of first transfer operations for transferring an electric charge stored in the photoelectric conversion unit to the first charge holding unit simultaneously in the plurality of pixel rows, while the third transfer unit is shifted from an off state to an on state after the third transfer unit is maintained in the off state; and
    performing a plurality of second transfer operations for transferring an electric charge stored in the photoelectric conversion unit to the second charge holding unit simultaneously in the plurality of pixel rows, while the fourth transfer unit is shifted from an off state to an on state after the fourth transfer unit is maintained in the off state;
    wherein a length of a time period in which electric charges to be transferred by performing the plurality of first transfer operations are stored in the photoelectric conversion unit is different from a length of a time period in which electric charges to be transferred by performing the plurality of second transfer operations are stored in the photoelectric conversion unit,
wherein the plurality of second transfer operations is performed in respective periods between two of the plurality of first transfer operations, and
wherein a number of times the plurality of first transfer operations is performed is different from a number of times the plurality of second transfer operations is performed.

2. The driving method for driving the imaging apparatus according to claim 1,
wherein a first period is a period in which a total of electric charges held in the first charge holding unit is stored in the photoelectric conversion unit,
wherein a second period is a period in which a total of electric charges held in the second charge holding unit is stored in the photoelectric conversion unit,
wherein a start time of the first period is different from a start time of the second period,
wherein an end time of the first period is different from an end time of the second period, and
wherein a center time between the start time and the end time of the first period is equal to a center time between the start time and the end time of the second period.

3. The driving method for driving the imaging apparatus according to claim 1,
wherein after an electric charge held in the first charge holding unit is transferred to the floating diffusion by the third transfer unit, and in a state where the electric charge from the first charge holding unit is held in the floating diffusion, an electric charge held in the second charge holding unit is transferred to the floating diffusion by the fourth transfer unit.

4. The driving method for driving the imaging apparatus according to claim 1,
wherein an electric charge held in the first charge holding unit and an electric charge held in the second charge holding unit are simultaneously transferred to the floating diffusion.

5. The driving method for driving the imaging apparatus according to claim 1,
wherein after an electric charge held in the first charge holding unit is transferred to the floating diffusion by the third transfer unit, and the electric charge transferred from the first charge holding unit to the floating diffusion is reset, an electric charge held in the second charge holding unit is transferred to the floating diffusion by the fourth transfer unit.

6. The driving method according to claim 1 further comprising:
using a signal based on the electric charge to be transferred by the third transfer unit and a signal based on the electric charge to be transferred by the fourth transfer unit when an image of one frame is generated.

7. The driving method for driving the imaging apparatus according to claim 1, wherein a length of time period in which an electric charge to be transferred by performing each of the plurality of first transfer operations is stored in the photoelectric conversion unit is longer than a length of time period in which an electric charge to be transferred by performing each of the plurality of second transfer operations is stored in the photoelectric conversion unit, and a number of times the plurality of first transfer operations is performed is larger than a number of times the plurality of second transfer operations is performed.

8. The driving method for driving the imaging apparatus according to claim 1, wherein an overflow drain transistor is further provided.

9. The driving method for driving the imaging apparatus according to claim 8, wherein the overflow drain transistor is shifted from an on state to an off state in each period between two of the plurality of first transfer operations or between two of the plurality of second transfer operations.

10. The driving method for driving the imaging apparatus according to claim 8, wherein the overflow drain transistor is in an on state when the third transfer unit is shifted from an off state to an on state or when the fourth transfer unit is shifted from an off state to an on state.

* * * * *